US011853578B2

(12) United States Patent
Walker et al.

(10) Patent No.: US 11,853,578 B2
(45) Date of Patent: Dec. 26, 2023

(54) SYSTEMS, DEVICES, AND METHODS FOR DATA MIGRATION

(71) Applicant: Micron Technology, Inc., Boise, ID (US)

(72) Inventors: Robert M. Walker, Raleigh, NC (US); Paul Rosenfeld, Bethesda, ID (US); Patrick A. La Fratta, McKinney, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/512,588

(22) Filed: Oct. 27, 2021

(65) Prior Publication Data

US 2022/0050616 A1 Feb. 17, 2022

Related U.S. Application Data

(63) Continuation of application No. 16/195,045, filed on Nov. 19, 2018, now Pat. No. 11,182,090.

(51) Int. Cl.
*G06F 3/00* (2006.01)
*G06F 3/06* (2006.01)
(Continued)

(52) U.S. Cl.
CPC .......... *G06F 3/0647* (2013.01); *G06F 3/0604* (2013.01); *G06F 3/0679* (2013.01);
(Continued)

(58) Field of Classification Search
None
See application file for complete search history.

(56) References Cited

U.S. PATENT DOCUMENTS

| 5,442,752 A | 8/1995 | Styczinski |
| 5,996,051 A | 11/1999 | Mergard |

(Continued)

FOREIGN PATENT DOCUMENTS

| CN | 1885277 A | 12/2006 |
| CN | 101369451 A | 2/2009 |

(Continued)

OTHER PUBLICATIONS

Chinese Patent Office, "Office Action", issued in connection with Chinese Patent Application No. 202210671318.7 dated Jan. 20, 2023 (6 pages) (5 pages of English Translation and 6 pages of Original Document).

(Continued)

*Primary Examiner* — Midys Rojas
(74) *Attorney, Agent, or Firm* — Holland & Hart LLP

(57) ABSTRACT

Methods, systems, and devices for performing data migration operations using a memory system are described. The memory system may include a component, such as a controller, for facilitating a transfer of data between a first memory device that may implement a first memory technology (e.g., having a relatively fast access speed) and a second memory device that may implement a second memory technology (e.g., having a relatively large capacity). The component may receive an indication of the data migration operation from a host device and may initiate a transfer of data between the first and second memory devices. The controller may include one or more buffers to store data being transferred between the first and second memory devices. In some cases, the transfer of data between the first and second memory devices may occur within the memory system and without being transferred through the host device.

20 Claims, 11 Drawing Sheets

(51) Int. Cl.
G06F 12/0895 (2016.01)
G06F 12/0866 (2016.01)

(52) U.S. Cl.
CPC ............ *G06F 3/068* (2013.01); *G06F 3/0613* (2013.01); *G06F 3/0656* (2013.01); *G06F 3/0673* (2013.01); *G06F 12/0866* (2013.01); *G06F 12/0895* (2013.01)

(56) References Cited

U.S. PATENT DOCUMENTS

| | | | |
|---|---|---|---|
| 7,500,075 | B1 | 3/2009 | Garrett |
| 9,081,669 | B2 | 7/2015 | Tadepalli et al. |
| 9,477,551 | B1 | 10/2016 | Piszczek et al. |
| 10,360,155 | B1 | 7/2019 | Thomas et al. |
| 10,782,911 | B2 | 9/2020 | Walker et al. |
| 10,956,347 | B2 * | 3/2021 | Mishima ................. G06F 3/061 |
| 2002/0105853 | A1 | 8/2002 | Naven |
| 2003/0188088 | A1 | 10/2003 | Kootstra |
| 2006/0294295 | A1 | 12/2006 | Fukuzo |
| 2007/0033355 | A1 | 2/2007 | Maki et al. |
| 2011/0213942 | A1 | 9/2011 | Zimmer et al. |
| 2013/0080389 | A1 | 3/2013 | Curley et al. |
| 2013/0305008 | A1 | 11/2013 | Kwon et al. |
| 2013/0329491 | A1 | 12/2013 | Chang et al. |
| 2014/0040553 | A1 | 2/2014 | Liang et al. |
| 2014/0219034 | A1 | 8/2014 | Gomez et al. |
| 2016/0085585 | A1 | 3/2016 | Chen et al. |
| 2017/0177541 | A1 | 6/2017 | Berman et al. |
| 2017/0229159 | A1 | 8/2017 | Huen et al. |
| 2017/0272515 | A1 | 9/2017 | Sanderson |
| 2017/0371539 | A1 | 12/2017 | Mai et al. |
| 2018/0005670 | A1 | 1/2018 | Lee et al. |
| 2018/0039541 | A1 | 2/2018 | Hahn et al. |
| 2018/0107552 | A1 | 4/2018 | Motwani et al. |
| 2018/0267737 | A1 | 9/2018 | Oe |
| 2018/0267739 | A1 | 9/2018 | Luo |
| 2018/0321880 | A1 | 11/2018 | Jung et al. |
| 2019/0220425 | A1 | 7/2019 | Zemach et al. |
| 2019/0236030 | A1 | 8/2019 | Lim et al. |
| 2020/0159434 | A1 | 5/2020 | Walker et al. |

FOREIGN PATENT DOCUMENTS

| | | |
|---|---|---|
| CN | 103985411 A | 8/2014 |
| CN | 104216837 A | 12/2014 |
| CN | 104508638 A | 4/2015 |
| CN | 106168882 A | 11/2016 |
| CN | 106575259 A | 4/2017 |
| CN | 107203336 A | 9/2017 |
| CN | 108089814 A | 5/2018 |
| CN | 108647153 A | 10/2018 |
| CN | 108780404 A | 11/2018 |

OTHER PUBLICATIONS

Chinese Patent Office, "Office Action," issued in connection with Chinese Patent Application No. 201911090160.9 dated Mar. 30, 2023 (24 pages with translation).

Chinese Patent Office, "Office Action," issued in connection with Chinese Patent Application No. 201911136571.7 dated Mar. 29, 2023 (18 pages with machine translation).

* cited by examiner

SYSTEMS, DEVICES, AND METHODS FOR DATA MIGRATION

CROSS REFERENCE

The present application for patent is a continuation of U.S. patent application Ser. No. 16/195,045 by Walker et al., entitled "SYSTEMS, DEVICES, AND METHODS FOR DATA MIGRATION," filed Nov. 19, 2018, assigned to the assignee hereof, and is expressly incorporated by reference in its entirety herein.

BACKGROUND

The following relates generally to operating a memory device and more specifically to a data migration dynamic random access memory.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the electronic device may read, or sense, at least one stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Volatile memory devices, e.g., DRAM, may lose their stored state over time unless they are periodically refreshed by an external power source. Non-volatile memory, e.g., FeRAM, may maintain their stored logic state for extended periods of time even in the absence of an external power source.

Improving memory devices, generally, may include increasing memory cell density, increasing read/write speeds, increasing reliability, increasing data retention, reducing power consumption, or reducing manufacturing costs, among other metrics. Some memory cells may be configured to store multiple states. Improving a bandwidth (e.g., quantity of data accessed during a given duration) of a memory device may be desired.

DETAILED DESCRIPTION

Figure 1:
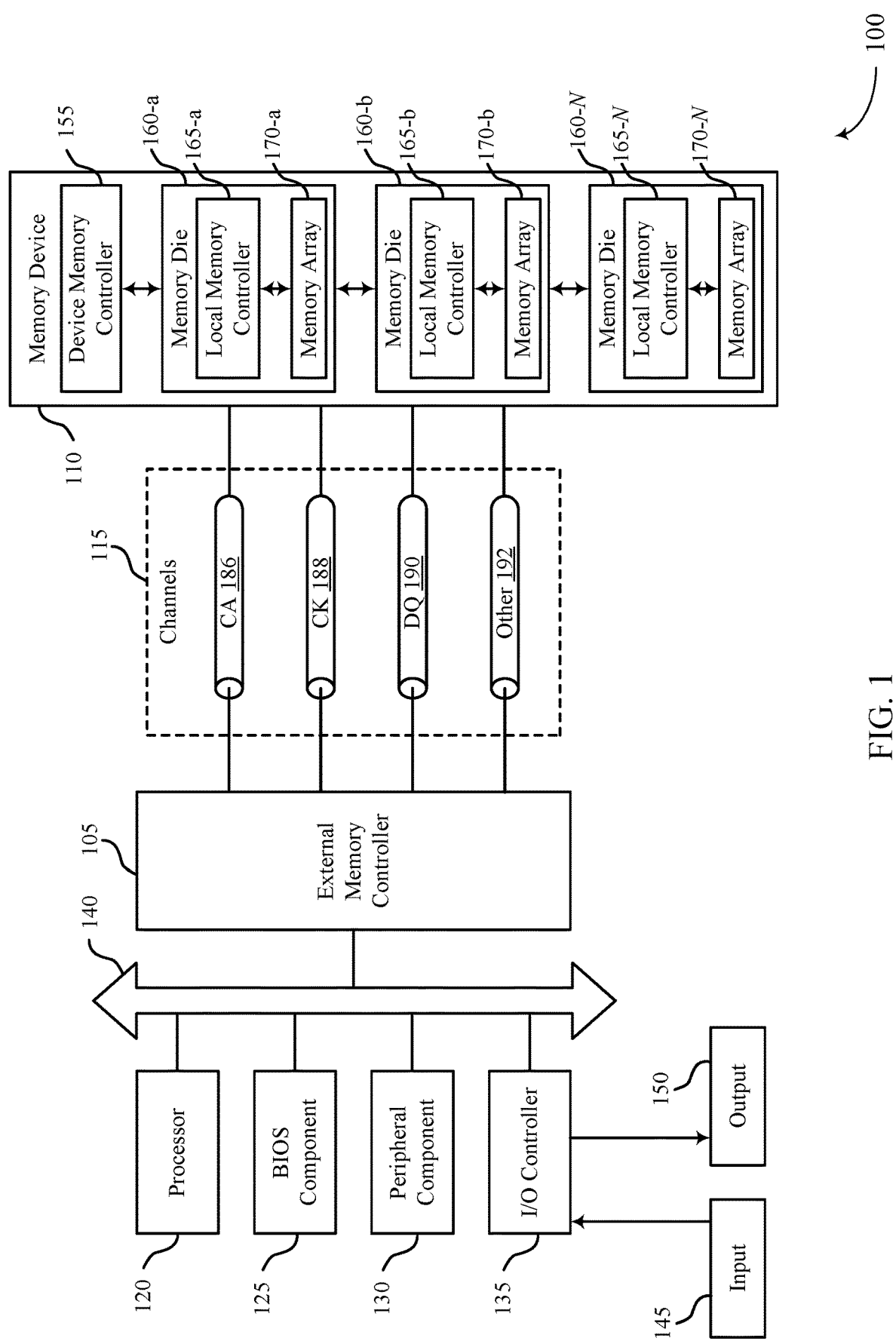
FIG. 1 illustrates an example of a system that supports data migration as disclosed herein.

Some memory devices may include an interface coupled with a host device and that may be configured to communicate commands and data between the memory device and a host device (or a memory controller of a host device). The interface may be a double data rate (DDR) interface and may conform to an industry standard specification such as a low-power DDR (LPDDR) specification, another DRAM specification (e.g., DDR4, DDR5, etc.), or a different memory specification directed to graphics or high bandwidth memory; or it may conform to a persistent memory or storage class memory specification, for example. A performance of the signaling between such a memory system and the host device may vary based on a status of the memory system.

For example, performance by the memory system may be based on whether the memory system includes data that the host device requests (e.g., during a read operation) or whether the memory system includes an inadequate amount of space to store data that the host device wants to save (e.g., during a write operation) as part of an access operation. If the memory device of the memory system does not include the data or does not include an adequate amount of space to support the access operation, the host device (or the host device through the memory device) may transfer some of the data on the memory device to a storage device (e.g., a solid-state drive (SSD)) associated with the host device as part of a data migration operation.

In some cases, the host device may transfer the data using a file system. When using the file system, the data may be transferred over channels between a memory system (e.g., the memory device, the storage device) and the host device. Transferring the data over these channels may cause the performance (e.g., bandwidth or latency) of the memory device to decrease during such data migration operation.

In some cases, the memory device may be part of a memory system that includes at least two types of memory devices. The memory system may include a first memory device having a relatively fast access speed and a second memory device having a relatively large capacity (e.g., a storage device). In some cases, the first memory device may include memory cells that implement volatile memory technology and the second memory device may include memory cells that implement non-volatile memory technology. In some cases, the first memory device may include DRAM cells and the second memory device may include 3-dimensional (3D) Not-AND (NAND) or 3D XPoint™ memory cells. A first memory device (e.g., DRAM) may provide a fast data exchange path between the first memory device (e.g., DRAM) and the second memory device (e.g., 3D NAND or 3D) XPoint™ memory device) may facilitate an increased storage capacity available to a host device.

The two-tier memory system may provide an improved performance (e.g., bandwidth) when compared to a storage device that may support a file system because data being transferred as part of a data migration operation may not be communicated over channels linking the host device with the memory system generally. By incorporating the second memory device into a memory system (rather than being associated with the host device), the amount of data transmitted over channels between the host device and the memory system during a data migration operation may be reduced. Thus, the bandwidth and other performance parameters associated with the memory system may improve.

Techniques for performing data migration operations using a two-tier memory system are described herein. The memory system may include a page controller for facilitating the transfer of data between a first memory device that implements a first memory technology (e.g., DRAM) and a second memory device that implements a second memory technology (e.g., NAND or 3D XPoint™). The controller may receive an indication of the data migration operation from a data migration driver which may be associated with the host device. In response to the indication, the controller may initiate the transfer of data between the first memory device and the second memory device. The controller may include one or more data buffers to store data for transferring between the first memory device and the second memory device. For example, the controller may include a data buffer for storing data being transferred from the second memory device to the first memory device (e.g., a commit data buffer). The controller may also include a data buffer for storing data being transferred from the first memory device to the second memory device (e.g., an evict data buffer).

The data migration command may indicate an address for data within the second memory device. The page controller may determine a corresponding location or locations for storing the data within the first memory device (e.g., based on a mapping of addresses to the first memory device indicated by the driver prior to indicating the data migration operation). In some cases, the controller may break a received data migration command into one or more transactions. Each transaction may be defined based on the location or locations within the first memory indicated for storing data. For example, a transaction may correspond to data stored within a single bank of the first memory device. In another example, a transaction may correspond to data stored within a single bank cluster.

In some cases, the data migration operation may be executed opportunistically at a bank cluster of the first memory device. In this case, the controller may not execute the data migration command until a particular bank cluster has been accessed as part of an access operation initiated by the host device. In some cases, the opportunistic data migration operations may occur during access periods already being used to perform access operations requested by the host device. The memory system may include an additional interface to support a data migration operation during which a subset of data (e.g., a page) may be migrated during an access period that is already being used to access data requested by the host device. In such examples, the data migration operations may occur concurrently with a host device causing the memory device to be accessed as part of an access operation. In some cases, the memory system may execute a data migration operation as part of a background operation at the same time that the memory device may execute an access operation for the host device as part of a foreground operation.

The additional interface of the memory device may couple with the controller associated with the memory device and, in some cases, associated with other memory devices of a memory system that may be configured to control various aspects of the data migration operation in conjunction with the memory device (and the host device, in some examples). The additional interface may be configured to communicate with the controller—e.g., exchange data, receive commands, or transmit status updates. Additionally, the memory device may include one or more buffers to support the data migration operations. For example, the one or more buffers may be configured to store data (e.g., a page of data) read from the memory device or to be written to the memory device as part of the data migration operation. In some cases, the one or more buffers may be referred to as a data transfer buffer.

To facilitate opportunistic data migration operations, the memory device may include a bank cluster that may be coupled with a buffer (e.g., data transfer buffer). The bank cluster may include two or more banks of memory cells. The host device may be configured to address a bank of the bank cluster as part of an access operation using an interface that conforms to DDR specification (e.g., an LPDDR specification) or other specification. The host device may be configured to address a single bank of the bank cluster as part of an access operation—e.g., in accordance with the DDR specification. When the host device causes the bank of the bank cluster to be accessed by transmitting one or more commands and/or data using the DDR interface (e.g., a foreground operation), the controller, in conjunction with the memory device in some cases, may transfer data (e.g., read data, write data) between the buffer and an alternate bank of the bank cluster as part of a data migration operation (e.g., a background operation).

In this manner, a memory device may be configured to execute commands issued by a host device and concurrently execute data migration commands. In some cases, the memory device may mitigate reductions in performance (e.g., bandwidth and/or latency) caused by data migration operations. The memory device may be configured to perform a data migration operation as part of a background operation concurrent with performing foreground operation (e.g., access operation) requested by the host device. In other words, the host device may continue to operate the memory device using the interface (e.g., DDR4 interface), while the controller associated with the memory system may use the additional interface (which may be hidden from the host device) to execute to execute a data migration operation and support an improved overall bandwidth between the memory device and the host device.

Aspects of the disclosure are initially described in the context of a memory system in FIG. 1. Then, features of the disclosure are described in the context of a memory die (e.g., a memory device) in FIG. 2. The features of the disclosure are further described in the context of various systems and status registers that support data migration in FIGS. 3 through 9. These and other features of the disclosure are further illustrated by and described with reference to FIGS. 10 and 11, which include an apparatus diagram and a flowchart that relate to data migration.

FIG. 1 illustrates an example of a system 100 that utilizes one or more memory devices as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be a component configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least some portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host device, a host, or a memory controller of host device.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

In some cases, the memory device 110 may support a multi-tier memory system (e.g., two-tier memory system) or memory system as described herein. For example, a multi-tier memory system may include a first memory die 160-*a* that may implement a first type of memory technology (e.g., DRAM or FeRAM) configured with at least two interfaces (e.g., an interface and a data port interface as described herein) and a second memory die 160-*b* that may implement a second type of memory technology different than the first type (e.g., NAND or NAND or 3D XPoint™). The interface of the first memory die 160-*a* may be configured to couple with a host device (e.g., external memory controller 105) supporting an industry standard specification (e.g., an LPDDR specification). Additionally, the data port interface of the first memory die 160-*a* may be configured to couple with a controller (e.g., device memory controller 155).

The memory device 110 may include a device memory controller 155 (e.g., a page controller) for facilitating the transfer of data between the first memory die 160-*a* and the second memory die 160-*b*. The device memory controller 155 may receive an indication of the data migration operation from a data migration driver which may be associated with an external memory controller 105 (e.g., a host device). In response to the indication, the device memory controller 155 may initiate the transfer of data between the first memory die 160-*a* and the second memory die 160-*b*. The device memory controller 155 may include one or more data buffers to store data for transferring between the first memory die 160-*a* and the second memory die 160-*b*. For example, the device memory controller 155 may include a commit data buffer for storing data being transferred from the second memory die 160-*b* and the first memory die 160-*a*. The device memory controller 155 may also include an evict data buffer for storing data being transferred from the first memory die 160-*a* and the second memory die 160-*b*.

The data migration command may indicate an address for data within the second memory die 160-*b*. The device memory controller 155 may determine a corresponding location or locations for storing the data within the first memory die 160-*a* (e.g., based on a mapping of addresses to the first memory device indicated by the driver prior to indicating the data migration operation). In some cases, the device memory controller 155 may break a received data migration command into one or more transactions. Each transaction may be defined based on the location or locations within the first memory die 160-*a* indicated for storing data. For example, a transaction may correspond to data stored within a single bank of the first memory die 160-*a*. In another example, a transaction may correspond to data stored within a single bank cluster.

The host device may include a data migration driver for facilitating the transfer of data within the memory device 110. For example, the transfer of data may be between a first memory die 160-*a* (e.g., DRAM) and a second memory die 160-*b* that implements a second memory technology (e.g., NAND or 3D XPoint™). The driver may indicate the data migration operation to a controller of the memory system (e.g., device memory controller 155, local memory controller 165). The controller may initiate the transfer of data between the first memory die and the second memory die based on the receiving the data migration operation indication from the driver. The controller may be configured to control various aspects of the data migration operation as part of a background operation in conjunction with the first memory die 160-*a*. Further, a second memory die 160-*b* may include a 3D XPoint™ memory cells and be configured to couple with the device memory controller 155. The second memory die 160-*b* may provide a non-volatile memory capacity that may provide a relatively fast memory space available for the first memory die 160-*a* (e.g., DRAM) to swap data (e.g., storing a page of data, retrieving a page of data) to support an improved bandwidth.

The driver may break a data migration request into one or more sub-commands, requests, or sub-requests and transmit those sub-commands, requests, or sub-requests to a correct controller associated with a first and second memory device of a correct memory bank in order to facilitate channel interleaving. The channel interleaving may increase the speed of access operations. For example, access operations may be configured to use multiple memory banks in parallel, resulting in higher memory throughputs by reducing time spent waiting for other access operations to complete on a given memory bank. The driver may determine a size of interleaving (e.g., the size of each a portion of data associated with each of the one or more sub-commands, requests, or sub-requests) and transmit each of the one or more sub-commands, requests, or sub-requests accordingly. In some cases, the driver may determine an interleaving pattern according to a mapping of the data to the first memory die (e.g., a mapping of an address associated with the data to a location within the memory array 170). In some cases, the driver may indicate the mapping to a controller (e.g., the device memory controller 155 or a local memory controller 165) prior to executing a data migration operation (e.g., during an initialization procedure, during a configuration).

The system 100 may further include a processor 120, a basic I/O system (BIOS) component 125, one or more peripheral components 130, and an I/O controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, etc. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

In some cases, one or more memory dice 160 may be configured to include a buffer (e.g., data transfer buffer as described herein). In some cases, the buffer may be configured as a set of smaller-sized buffers and the smaller-sized buffers of the set may be distributed within a memory array (e.g., memory array 170-a). Such distributed buffer configuration may facilitate each smaller-sized buffer of the set to be located near a part of memory array (e.g., a bank cluster of memory array 170-a) that may be associated with the smaller-sized buffer of the set. In other cases, the buffer may be configured to be common to the memory array (e.g., memory array 170-a) and may be located within a memory die (e.g., memory die 160-a).

In some cases, the memory arrays 170 may be configured to include one or more bank clusters that may be coupled with a buffer (e.g., data transfer buffer as described herein). Each bank cluster may be configured to include two or more banks. In some cases, a host device (e.g., external memory controller 105) may access a first bank of a bank cluster during an access period of an access operation (e.g., read operation, write operation). Additionally, a second bank of the bank cluster may be configured to transfer data with the buffer during the access period as part of a data migration operation (e.g., a background operation) concurrent with the first bank being accessed by the host device (e.g., a foreground operation). In some cases, the host device (e.g., external memory controller 105) may be configured to access a single bank of a bank cluster during an access period as part of the access operation.

In some cases, a data migration operation may be executed opportunistically. That is, the controller may not execute the data migration command until a bank cluster of a first memory array (e.g., memory array 170-a) has been accessed in response to an access instruction from a host device (e.g., external memory controller 105). In some cases, the access instruction may be distinct from the data migration operation, or part of a foreground operation initiated by the host device. In some other cases, the driver (e.g., included by the external memory controller 105) may indicate a dummy access command directed to the specific bank cluster in order to facilitate an execution of the data migration operation by a specific time. The dummy access command may be for an access operation not associated with a foreground operation of the memory system.

In some cases, one or more memory dice 160 may configured to include an interface (e.g., page port interface as described herein) configured to communicate with a controller (e.g., device memory controller 155) as part of a data migration operation. In some cases, a buffer of a memory die (e.g., memory die 160-a) may be coupled with the interface and configured to store data as part of the data migration operation. In some cases, the interface may include a data channel configured to transmit and receive data between the buffer and the controller, a command channel configured to receive an access command from the controller, a response channel configured to transmit a response to the controller, or a data bus, or any combination thereof.

In some cases, one or more memory dice 160 may configured to include a second interface (e.g., DDR interface as described herein) that may be coupled with a bank cluster (e.g., a bank cluster of memory array 170-a of memory die 160-a). The second interface may be configured to communicate commands or data with a host device (e.g., external memory controller 105) as part of the data migration operation or during an access operation. In some cases, one or more memory dice 160 (e.g., local memory controllers 165 of the one or more memory dice 160) may receive a data migration command from the host device (e.g., external memory controller 105) using the second interface. In some cases, one or more memory dice 160 (e.g., local memory controllers 165 of the one or more memory dice 160) may support an access command from the host device using the second interface.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120.

In some examples, the device memory controller 155 may be configured to control various aspects of the data migration operation in conjunction with one or more memory dies 160. In some cases, the device memory controller 155 may be referred to as a page controller. In some cases, the device memory controller 155 may receive a command to transfer data between a first bank of a bank cluster (e.g., a first bank of a bank cluster in a memory array 170-a) and a different bank (e.g., a bank of a bank cluster in a memory array 170-b). The device memory controller 155 may determine that a host device (e.g., external memory controller 105) addresses a second bank of the bank cluster (e.g., a second bank of the bank cluster in the memory array 170-a) during an access period.

Further, the device memory controller 155 (or the device memory controller 155 in conjunction with a local memory controller 165-a coupled with the memory array 170-a) may transfer the data between the first bank of the bank cluster (e.g., the first bank of the bank cluster in the memory array 170-a) and a buffer (e.g., a data transfer buffer in a memory die 160-a) during the access period that the host device (e.g., external memory controller 105) addresses the second bank of the bank cluster (e.g., the second bank of the bank cluster in the memory array 170-a) based on the command, where the buffer may be configured to store the data associated with the first bank as part of a data migration operation.

The memory controller may further indicate a status of the data migration operation to the host device (e.g., external memory controller 105). The status may indicate to the host device whether a data migration command may be stalled (e.g., due to the bank cluster associated with the data migration operation not being accessed in response to an access command from the host device) or completed. In some cases, the memory controller may indicate the status of a corresponding data transfer buffer (e.g., whether data transfer buffer in memory die 160-a contains valid data) within a status update register.

In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110.

For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission media (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of a signal path of the channel 115.

Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data (DQ) channel 190 may be ×4 (e.g., including four signal paths), ×8 (e.g., including eight signal paths), ×16 (including sixteen signal paths), etc.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended.

In some cases, the clock signal may be a 1.5 GHz signal. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK may therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate (e.g., bi-directional) information to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may, optionally, include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
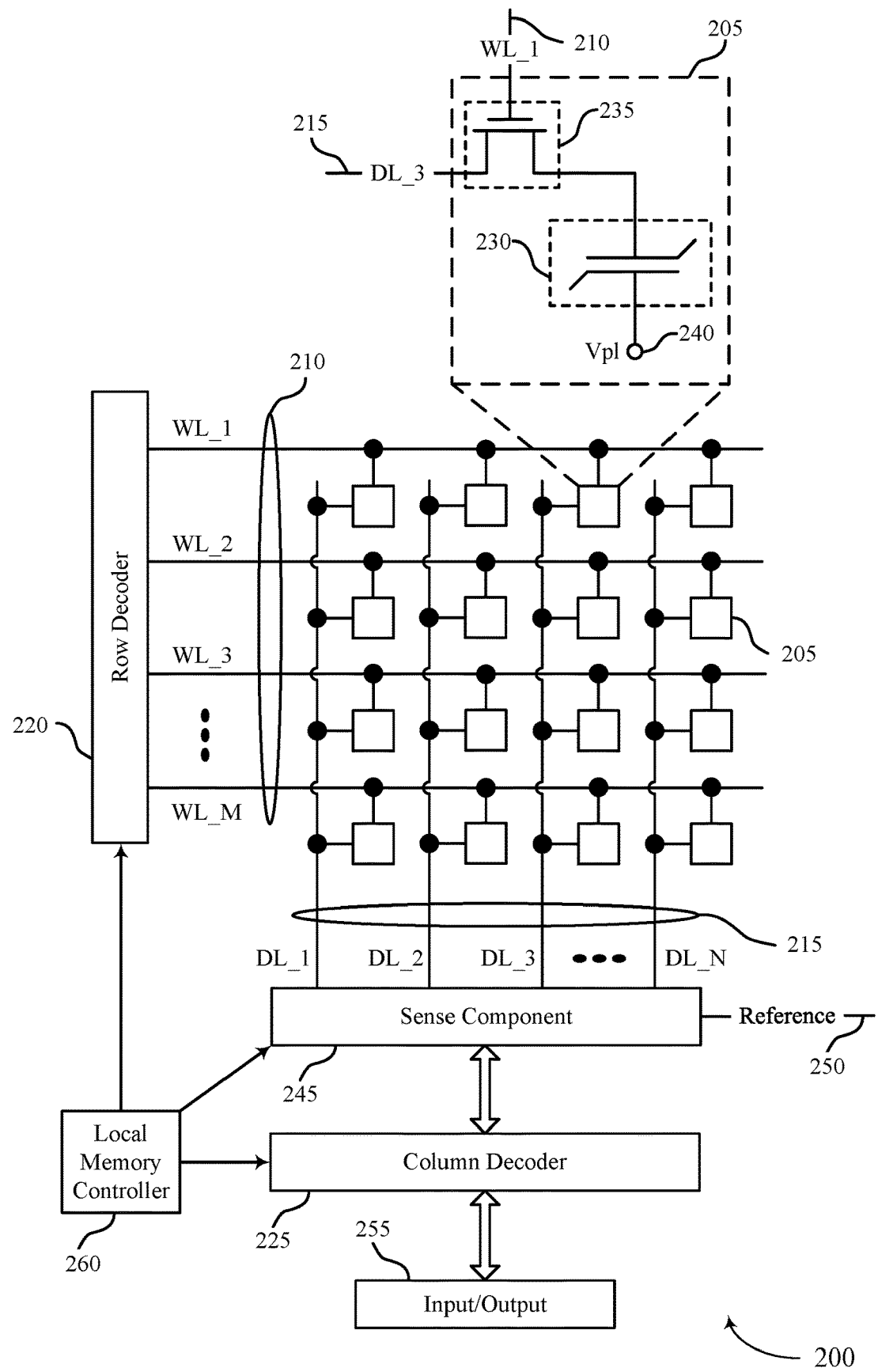
FIG. 2 illustrates an example of a memory die that supports data migration as disclosed herein.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. As used herein, a charge refers to an amount of charge present in or on a component or a conductor and is not limited to a particular value carried by a single proton or electron. DRAM architectures may include a capacitor (e.g., a capacitor 230) that includes a dielectric material to store a charge representative of the programmable state. In some examples, the memory cell 205 may be coupled with a sense component 245 via a digit line 215.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 and a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a cell switching component 235. The capacitor 230 may be an example of a dielectric capacitor or a ferroelectric capacitor. A first node of the capacitor 230 may be coupled with the cell switching component 235 and a second node of the capacitor 230 may be coupled with a voltage source 240. In some cases, the voltage source 240 may be the cell plate reference voltage, such as Vp1. In some cases, the voltage source 240 may be an example of a plate line coupled with a plate line driver. The cell switching component 235 may be an example of a transistor or any other type of switch device that selectively establishes or de-establishes electronic communication between two components.

In some cases, a set of memory cells 205 may be configured to include at least one bank cluster that may include two or more banks of memory cells 205. In some cases, the set of bank clusters each may include a set of banks and a set of sense components (e.g., sense component 245). In some cases, a host device (e.g., a memory controller of a host device) may access a bank of the bank cluster during an access operation using an interface that may conform to a DDR specification or other specification (e.g., LPDDR, DDR4, DDR5, etc.). The host device may be configured to access a single bank of the bank cluster—e.g., in accordance with the DDR specification.

When the host device (e.g., the memory controller of the host device) accesses the bank of the bank cluster using the DDR interface, a controller (e.g., a page controller as described herein), in conjunction with the memory die 200 (e.g., a local memory controller 260 of the memory die 200) in some cases, may transfer data (e.g., read data, write data) between a buffer (e.g., data transfer buffer as described herein) and an alternate bank of the bank cluster as part of a data migration operation using another interface (e.g., data port interface as described herein).

In some cases, the memory die 200 may be configured to include a buffer (e.g., data transfer buffer as described herein) that may be configured to couple with the bank clusters of the memory die 200. In some cases, the buffer may be configured to include a set of smaller-sized buffers and the smaller-sized buffers of the set may be distributed within a memory array including memory cells 205. Such distributed buffer configuration may facilitate each smaller-sized buffer of the set to be located near a part of memory array (e.g., a bank cluster) that may be associated with the smaller-sized buffer of the set. In other cases, the buffer may be configured to be common to the memory array of the memory die 200 and may be located within a memory die (e.g., memory die 200).

In some examples, the buffer may be used to transfer data between memory die 200 and a second memory die during a data migration operation. The buffer (e.g., the data transfer buffer as described herein) may be coupled to one or more buffers with a controller (e.g., a page controller as described herein). The page controller may indicate (e.g., via a transfer register stored within the memory die 200) a data transfer. The buffer may be configured to transfer the indicated data between the memory die 200 and a data buffer at the page controller.

In some cases, the page controller may include distinct data buffers depending on the type of data migration operation (e.g., a commit data buffer and an evict data buffer corresponding to a commit data migration operation and an evict data migration operation respectively). The buffer may be configured to transfer data between the type of data buffer at the controller corresponding to the type of indicated data migration.

Selecting or deselecting the memory cell 205 may be accomplished by activating or deactivating the cell switching component 235. The capacitor 230 may be in electronic communication with the digit line 215 using the cell switching component 235. For example, the capacitor 230 may be isolated from digit line 215 when the cell switching component 235 is deactivated, and the capacitor 230 may be coupled with digit line 215 when the cell switching component 235 is activated.

In some cases, the cell switching component 235 is a transistor and its operation may be controlled by applying a voltage to the transistor gate, where the voltage differential between the transistor gate and transistor source may be greater or less than a threshold voltage of the transistor. In some cases, the cell switching component 235 may be a p-type transistor or an n-type transistor. The word line 210 may be in electronic communication with the gate of the cell switching component 235 and may activate/deactivate the cell switching component 235 based on a voltage being applied to the word line 210.

A word line 210 may be a conductive line in electronic communication with a memory cell 205 that is used to perform access operations on the memory cell 205. In some architectures, the word line 210 may be in electronic communication with a gate of a cell switching component 235 of a memory cell 205 and may be configured to control the cell switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the cell switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a charge stored on the capacitor 230 of the memory cell 205 and determine a logic state of the memory cell 205 based on the stored charge. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change.

The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals.

The detected logic state of memory cell 205 may be output through column decoder 225 as output 255. In some cases, the sense component 245 may be part of another component (e.g., a column decoder 225, a row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations.

In some cases, the local memory controller 260 may indicate a status of a data migration operation to a host device by updating a status update register corresponding to the data migration operation. The status may indicate to the host device whether a data migration command may be stalled (e.g., due to the bank cluster associated with the data migration operation not being accessed in response to an access command from the host device) or completed. In some cases, the local memory controller 260 may indicate the status of a corresponding data transfer buffer (e.g., whether a data transfer buffer of memory die 200 contains valid data) within the status update register.

The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205).

The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
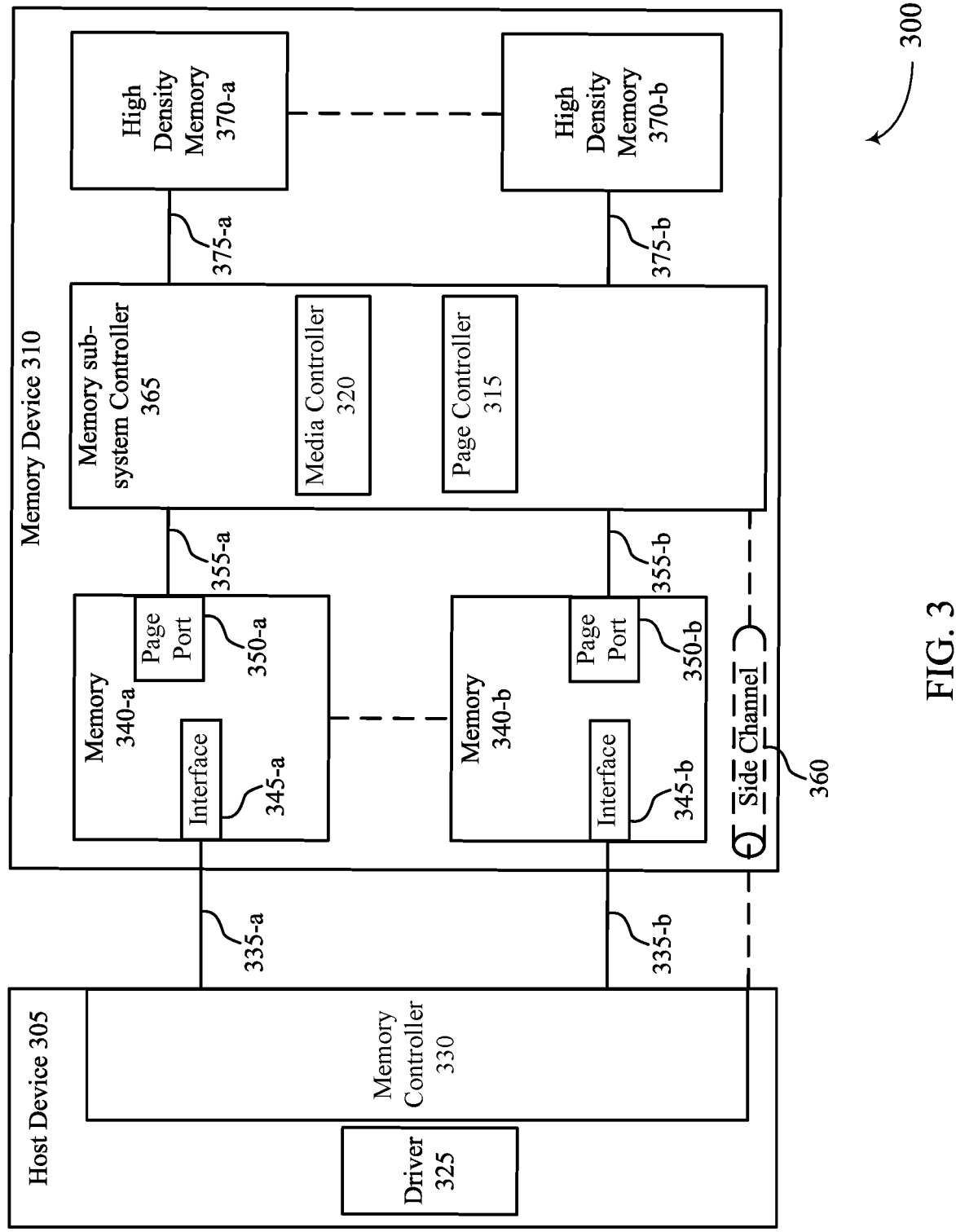
FIG. 3 illustrates an example of a system that supports data migration as disclosed herein.

FIG. 3 illustrates an example of system 300 that supports data migration as disclosed herein. The system may include one or more components as described with reference to FIGS. 1 and 2. For example, host device 305 may be an example of the external memory controller 105 as described with reference to FIG. 1; the memory 340 and the high density memory 370 may be an example of one or more of the memory dice 160 as described with reference to FIG. 1; the memory sub-system controller 365 and the page controller 315 may be examples of the device memory controller 155 as described with reference to FIG. 1; and the media controller 320 may be an example of a local memory controller 165 as described with reference to FIG. 1, which may be an example of a local memory controller 260 as described with reference to FIG. 2.

The memory device 310 may include more than one memory die as discussed with reference to FIG. 1. For example, the memory device 310 may include more than one memory die corresponding to the memory 340-a and the memory 340-b as well as more than one memory die corresponding to high density memory 370-a and 370-b. In some cases, the memory die may be broken up into separate dual inline memory modules (DIMMs).

In this case, the memory 340-a and high density memory 370-a may correspond to a first inline memory module of a DIMM or a first DIMM while the memory 340-b and high density memory 370-b may correspond to a second inline memory module of a DIMM or a second DIMM. Further, the paths corresponding to each DIMM (made up of paths 335, 355, and 375) may correspond to distinct channels such that the path for communicating between the high density memory 370-a and the high density memory 370-b may be moving through the memory device 310 to the host device 305 (e.g., via paths 375-a, 355-a, and 335-a respectively) and back through the memory device 310 (e.g., via paths 335-b, 355-b, and 375-b respectively).

The memory device 310 may also include memory sub-system controller 365 which further includes a page controller 315 and a media controller 320. In some cases, the page controller 315 may be coupled to the memory 340 (e.g., via a path 355 and a page port interface 350) and the media controller 320. The media controller 320 may in turn be coupled to the high density memory 370 via a path 375.

The memory device 310 may support a two-tier memory system that may include a memory 340 having a relatively fast access speed (e.g., DRAM, FeRAM, PCM). In some cases, the memory 340 may be an example of a page migration DRAM configured to store data with a relatively fast access and transfer data with a high density memory (e.g., such as high density memory 370) at the memory device 310. The memory device 310 may further include a high density memory 370 having a relatively large capacity (e.g., 3D NAND, 3D) XPoint™, or a solid-state memory device). The memory device 310 may include a path 335 to communicate with a host device 305 (or a memory controller 330 of the host device 305) via an interface 345 (e.g., a DDR interface that conforms to LPDDR, DDR3, DDR4, DDR5, GDDR3, GDDR4, GDDR5, GDDR6, etc.).

The path 335 may support a bandwidth that may vary drastically based on a status of the memory 340 as to whether the memory 340 includes data that the host device 305 requests (e.g., during a read operation) or the memory 340 includes adequate space to store data that the host device 305 wants to save (e.g., during a write operation) during an access operation. If the memory 340 does not include the data or adequate space to support the access operation, the host device 305 (or the host device 305 through the path 335 coupled to the interface 345) may need to access the high density memory 370 via the same path 335. Then, the available bandwidth at path 335 to the memory device 310 may decrease significantly for some subsequent access operations.

In order to achieve a less variable bandwidth (e.g., prevent the bandwidth from decreasing significantly during a data migration operation), an additional interface may be implemented to the memory device 310 to support a data migration operation during which a subset of data (e.g., a page of data) may be migrated as part of a background operation (e.g., a data migration operation) while the host device 305 may access the memory device 310 as part of a foreground operation. The additional interface of the memory device 310 may couple a page controller 315 (and memory sub-system controller 365) to the interface 345 (e.g., via the page port interface 350).

Additionally or alternatively, the page controller 315 may be coupled to the host device 305 via a side channel 360. The page controller 315 may be configured to control various aspects of the data migration operation. Additionally, the memory device 310 may include a buffer at each of the memory 340 to support the data migration operation. For example, the buffer may be configured to store data (e.g., at least a portion of the data being transferred as part of the data migration operation) read from a memory 340 or to be written to the memory 340 as part of the data migration operation. In some cases, the buffer may be referred to as a data transfer buffer. Additionally or alternatively, the page controller 315 may include one or more buffers for transferring data between a data transfer buffer of a memory 340 and the media controller 320. In some cases, the page controller 315 may include a distinct buffer for each of a commit data migration operation and an evict data operation.

Therefore, the system 300 may enable the host device 305 to access memory 340-b using an interface 345-b (e.g., as part of a foreground operation) concurrently to the page controller 315 and the media controller 320 transferring data (e.g., read data, write data) between the memory 340-b and the high density memory 370-b (e.g., as part of a background data migration operation). In some cases, the access operation may include the host device 305 accessing a memory 340 by issuing an access command to the memory 340, which the memory 340 may use to address or access the location requested by the host device 305.

The host device 305 may indicate a data migration operation to the page controller 315 in the event that a fault occurs during an access operation. The fault may occur when the memory 340 does not include data that the host device 305 requests (e.g., during a read operation). In this example, the host device 305 may indicate a data migration corresponding to a data commit to the page controller 315. The data commit may include data being transferred from the high density memory 370 to the memory 340. In some cases, the data may correspond to a page of data such that a page fault may result in a page migration for a page commit.

Additionally or alternatively, the fault may occur when the memory 340 does not include adequate space to store data that the host device 305 wants to save (e.g., during a write operation) during an access operation. In this example, the host device 305 may indicate, to the page controller 315, a data migration corresponding to a data evict. The data evict may include data being transferred from the memory 340 to the high density memory 370. In some cases, the data may correspond to a page of data such that a page fault may result in a page migration for a page evict. During the data migration operation, the host device 305 may continue to transmit access commands to the memory device 310 and the memory device 310 may continue to execute one or more of the access commands.

The host device 305 may include a driver 325 and a memory controller 330 of the host device 305. The driver 325 may be an example of a page migration driver and may initiate data migrations by communicating a data migration request to the memory sub-system controller 365. The driver 325 may transmit the request to the memory sub-system controller 365 via a path 335, the side channel 360, or a register space. For example, the driver 325 may transmit the data migration request by memory controller 330, via path 335-a and interface 345-a, to the memory 340-a. The memory 340-a may indicate the data migration request, via the page port interface 350-a and path 355-a, to the memory sub-system controller 365. In another example, the driver 325 may indicate the data migration request in a register space. In this example, the memory sub-system controller 365 may poll the register space to determine if a data migration has been requested.

The data migration request may be broken up into one or more requests (e.g., more than one sub-request). That is, the driver 325 may determine to initiate a data migration (e.g., based on a fault) and break the data (e.g., the data being based on the fault) into one or more sub-sections of data. For example, the driver 325 may break a page of data (e.g., as indicated by a page fault) into four portions and break the indication for the data migration into four corresponding distinct sub-requests. Each of the four sub-requests may be transmitted via a path 335-a or path 335-b (e.g., one or more of the four sub-requests may be transmitted to distinct memory banks).

For example, two sub-requests may be sent via path 335-*a* while two sub-requests may be sent via path 335-*b*. This may be referred to as interleaving, where the driver 325 breaks up the data into more than one portion of data. The driver 325 may determine an interleaving pattern based on a mapping of the data to the memory 340 (e.g., a mapping of an address associated with the data to a location at the memory 340). In some cases, the driver 325 may indicate the mapping to page controller 315 prior to indicating a request to perform a data migration operation (e.g., during an initialization procedure, during a configuration).

After receiving the request to perform a data migration operation (or a sub-request to perform a portion of a data migration) between a memory 340 and a high density memory 370, the memory sub-system controller 365 may facilitate the transfer of data (e.g., data indicated as part of the data migration operation by the sub-request). Specifically, the page controller 315 may receive the request to perform the data migration operation and may transfer the requested data between the memory 340 and the high density memory 370 by communicating with the media controller 320.

In some cases, the data indicated for transfer by the sub-request may be stored in more than one bank within a memory 340-*a* or 340-*b*. Here, the page controller 315 may determine to transfer data to or from the memory 340 in multiple transactions. That is, a single transaction may correspond to transfer of data between a single bank of the memory 340 and a data buffer at the page controller 315. The data buffer at the page controller 315 may store data (e.g., corresponding to one or more transactions) to be transferred between the page controller 315 and the media controller 320. The media controller 320 may facilitate a data transfer between the data buffer at the page controller 315 and the high density memory 370 via a path 375.

After the data indicated by a sub-request has been transferred between the memory 340 and the high density memory 370, the page controller 315 may update a status register corresponding to the sub-request. The host device 305 may poll the status register to determine when a data migration has been completed (e.g., when each of the sub-requests corresponding to the data migration have been completed). In some cases, the page controller 315 may communicate a completion of a sub-request to the host device 305 directly via the side channel 360.

Figure 4:
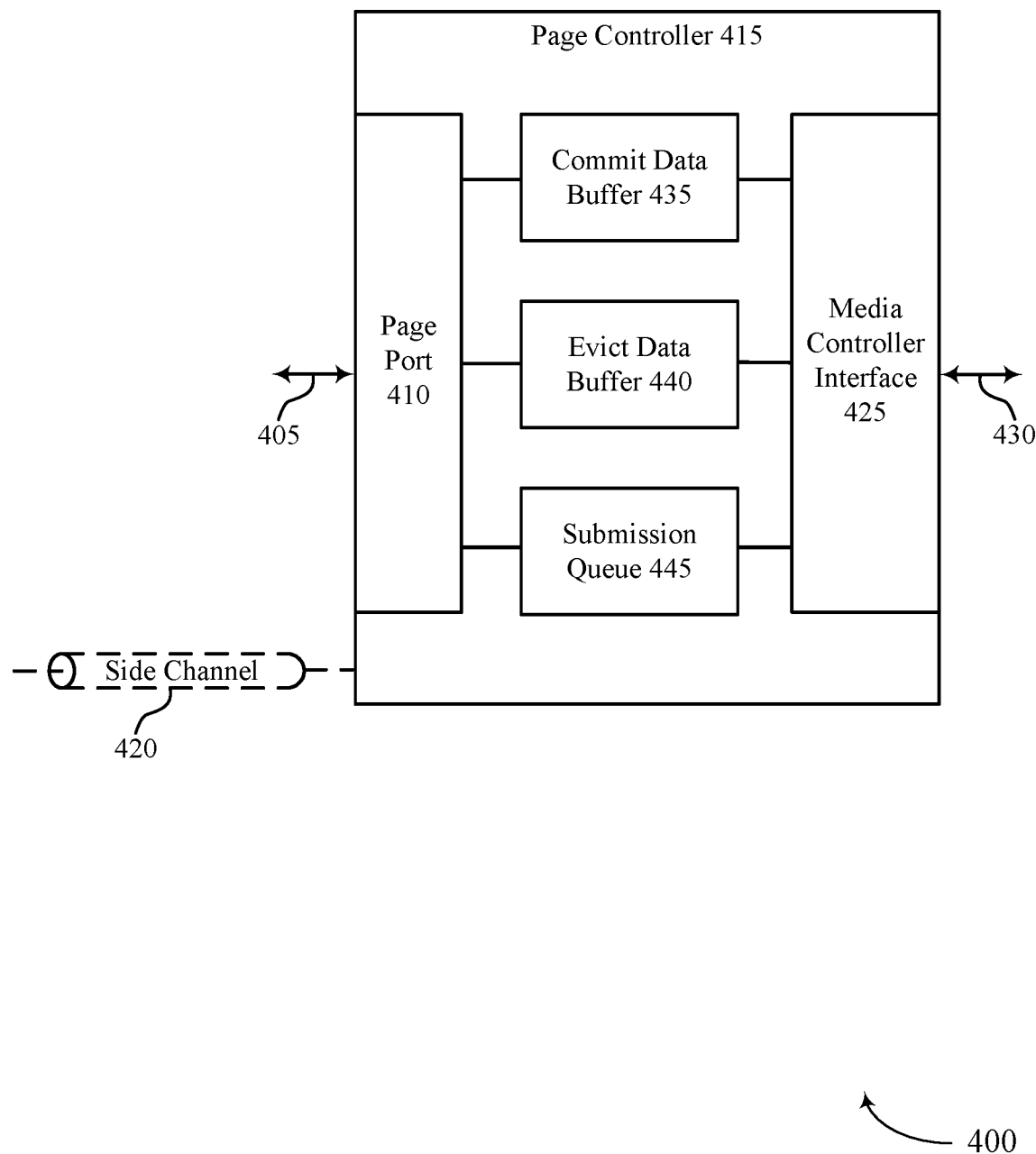
FIG. 4 illustrates an example of a system that supports data migration as disclosed herein.

FIG. 4 illustrates an example of system 400 that supports data migration as disclosed herein. The system may include one or more components as described with reference to FIGS. 1, 2, and 3. For example, the page controller 415 may be an example of the device memory controller 155 as described with reference to FIG. 1 or may be an example of the page controller 315 as described with reference to FIG. 3.

The page controller 415 may receive an indication from a host device (e.g., as described with reference to FIG. 3) of a data migration operation. The page controller 415 may receive the indication via the page port 410 which may couple the page port 410 to a memory device (e.g., a DRAM memory device such as memory 340 as described with reference to FIG. 3). In this case, the page controller 415 may receive the indication of the data migration via a register space or a memory mapped region. For example, the page controller 415 may poll a register space at the memory. Additionally or alternatively, the page controller 415 may receive the indication via the side channel 420. In some cases, the side channel 420 may be a channel for data migration communications between the page controller 415 and a host device.

The page port 410 may be an interface for communications (e.g., data, commands, status) to be transferred between the first memory and the page controller 415. The page controller 415 may include a media controller interface 425. The media controller interface 425 may be an interface for the page controller 415 to transfer data, commands, and/or status indications to or from the second memory during a data migration operation using one or more channels 430.

The page controller 415 may further include a submission queue 445. The submission queue 445 may store one or more requests associated with data migration operations. In some cases, the request may correspond to a command to transfer data between a first memory (e.g., a DRAM, memory 340 as discussed with reference to FIG. 3) and a second memory (e.g., a high density memory such as high density memory 370 as discussed with reference to FIG. 3). The submission queue 445 may store a commit command for a data migration operation.

For example, the submission queue 445 may store a commit command in the event that the first memory does not include data that the host device requests (e.g., during a read operation). The data indicated by the commit command may include data being transferred from the second memory to the first memory. Additionally or alternatively, the submission queue 445 may store an evict command for a data migration operation. For example, the submission queue 445 may store an evict command in the event that the first does not include adequate space to store data that the host device wants to save (e.g., during a write operation) during an access operation. The data indicated by the evict command may include data being transferred from the first memory to the second memory. In some cases, the submission queue 445 may store at least a portion of a status register.

The page controller 415 may further include one or more data buffers (e.g., the commit data buffer 435 and/or the evict data buffer 440) for storing data during data migration operations. For example, the commit data buffer 435 may store data being transferred from the second memory (e.g., via a media controller interface 425) to the first memory (e.g., via a page port 410) during an execution of a commit command. Additionally or alternatively, the evict data buffer 440 may store data being transferred from a first memory to a second memory during the execution of an evict command. In some cases, there may be a single data buffer utilized by the page controller 415 as both the evict data buffer 440 and the commit data buffer 435.

During a data migration operation corresponding to a commit command, the page controller 415 may receive an indication of the commit command (e.g., via the page port 410, via the side channel 420). The page controller 415 may store a commit command at the submission queue 445. The page controller 415 may retrieve, via the media controller interface 425, the data indicated by the commit command. In some cases, the data may correspond to a page of data stored, at an address indicated within the commit command, by the second memory. The page controller 415 may store the retrieved data within the commit data buffer 435.

In some cases, the page controller 415 may determine that the commit command corresponds to one or more transactions. That is, the page controller 415 may map the data address indicated by the commit command to a location or locations within the first memory device (e.g., using an address map indicated by the host device prior to receiving the commit command). Each transaction may be defined based on a location or locations within the first memory indicated for storing data. For example, a transaction may correspond to data stored within a single bank. In another example, a transaction may correspond to data stored within a single bank cluster.

The page controller 415 may break the commit command into one or more transactions, where each transaction includes a distinct portion of the data indicated within the commit command. The page controller 415 may transmit a first portion of data corresponding to a first transaction from the commit data buffer 435 to a transfer data buffer at the first memory (e.g., via the page port 410 and one or more channels 405). In some cases, the page controller 415 may receive an indication, from the first memory, indicating that the data transfer buffer may not contain valid data. This may correspond to the first portion of data being written from the transfer data buffer to a first bank of the first memory. In some cases, the first bank of the bank cluster may transfer data with a transfer data buffer while the host device may be accessing a second bank within the bank cluster.

When the page controller 415 receives the indication that the transfer buffer does not contain valid data, the page controller 415 may transfer a second portion of data (e.g., corresponding to a second transaction) from the commit data buffer 435 to the transfer data buffer at the first memory device. The page controller may continue to transfer data from the commit data buffer 435 to the transfer data buffer at the first memory until each portion of data included within the commit command has been transferred from the commit data buffer 435 to the first memory device.

In some cases, when the last of the portions of data is transferred to the first memory device (e.g., when the page controller 415 receives an indication that the transfer data buffer does not contain valid data), the page controller 415 may indicate to the host device the completion of the commit command for the data migration operation. In some cases, the indication may be transmitted directly to the host device via side channel 420. In some other cases, the page controller 415 may indicate the completion at the first memory (e.g., within a register space and/or a memory mapped region of the first memory).

During a data migration operation corresponding to an evict command, the page controller 415 may receive an indication of the evict command (e.g., via the page port 410, via the side channel 420). The evict command may indicate data (e.g., a page of data) to be transferred from the first memory to the second memory. The page controller 415 may store an evict command at the submission queue 445. In some cases, the page controller 415 may determine that the evict command corresponds to one or more transactions. That is, the page controller 415 may map the data address indicated by the evict command to a location or locations within the first memory device (e.g., using an address map indicated by the host device prior to receiving the evict command). Each transaction may be defined based on a location or locations within the first memory indicated for evicting data. For example, a transaction may correspond to data stored within a single bank. In another example, a transaction may correspond to data stored within a single bank cluster.

The page controller 415 may break the evict command into one or more transactions, where each transaction includes a distinct portion of the data indicated within the evict command. The page controller 415 may indicate the first transaction corresponding to a first portion of data within the first memory device. In some cases, the page controller 415 may receive an indication, from the first memory, indicating that the data transfer buffer may contain valid data. This may correspond to the first portion of data being written from a first bank of the first memory to the transfer data buffer. In some cases, the host device may access a same bank cluster (e.g., including the first bank) of the first memory (e.g., during a read or write operation) concurrently to the first portion of data being written from the first memory to the transfer data. The page controller 415 may transfer the data, via the one or more channels 405 and the page port 410, from the transfer data buffer to the evict data buffer 440.

When the page controller 415 transfers the data from the transfer data buffer to the evict data buffer 440, the page controller 415 may indicate a second transaction corresponding to a second portion of data within the first memory. The page controller may continue to transfer data from the transfer data buffer at the first memory to the evict data buffer 440 until each portion of data included within the evict command has been transferred to the evict data buffer 440. Once all of the data indicated by the evict command is stored within the evict data buffer 440, the page controller 415 may transmit, via the media controller interface 425, the data indicated by the evict command to the second memory. In some cases, the data may correspond to a page of data stored at an address indicated within the evict command.

In some cases, when the data is transferred to the second memory device, the page controller 415 may indicate to the host device the completion of the evict command for the data migration operation. In some cases, the indication may be transmitted directly to the host device via side channel 420. In some other cases, the page controller 415 may indicate the completion at the first memory (e.g., within a register space and/or a memory mapped region of the first memory).

Figure 5:
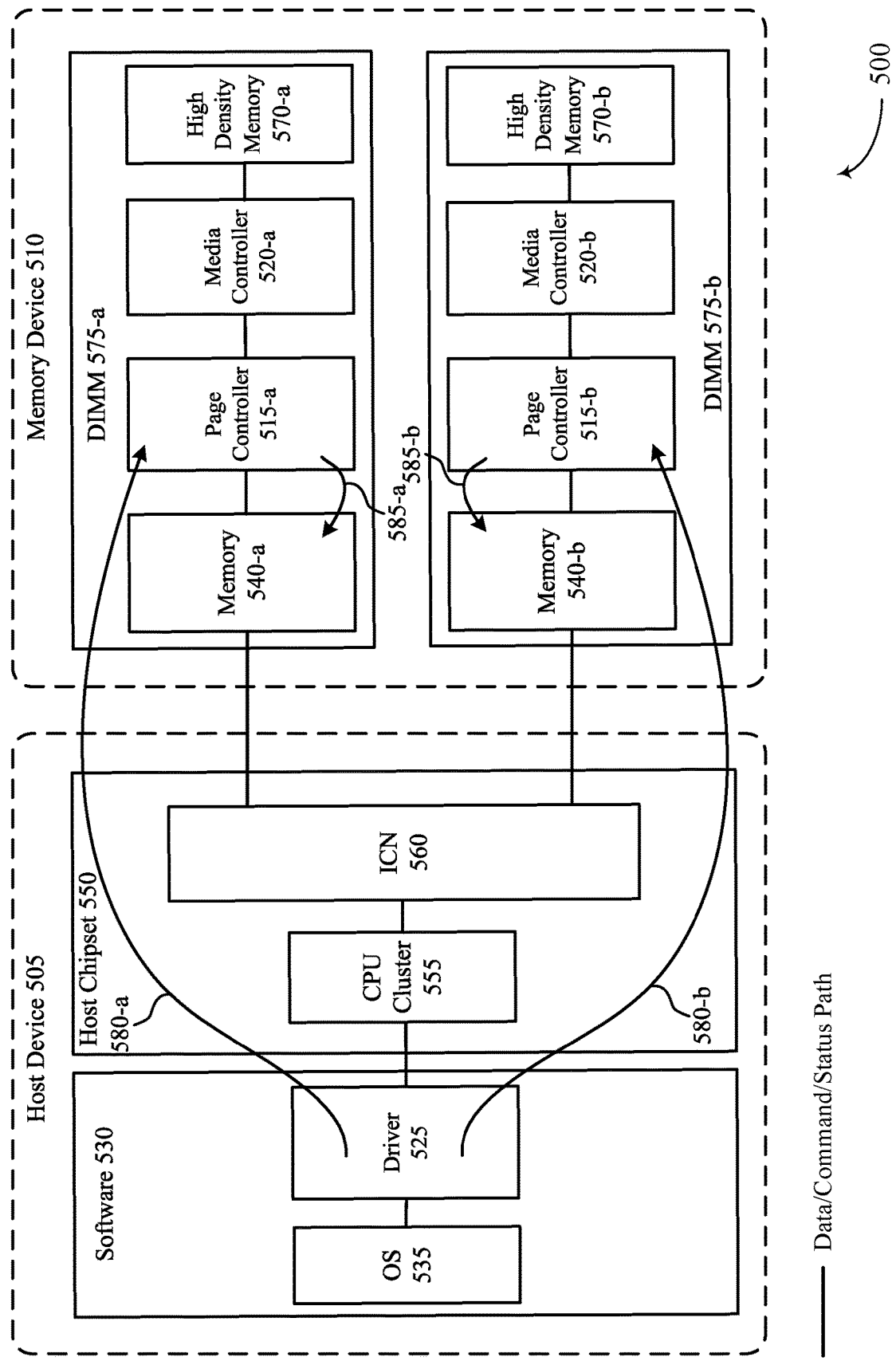
FIG. 5 illustrates an example of a system that supports data migration as disclosed herein.

FIG. 5 illustrates a system 500 that supports data migration as disclosed herein. The system 500 illustrates how a driver 525 may support channel interleaving for data migration in accordance with the present disclosure. The system 500 may include one or more components described herein with reference to FIGS. 1, 2, 3, and 4. For example, the page controller 515 may be an example of the device memory controller 155 as described with reference to FIG. 1, which may be an example of the page controller 315 and 415 as described with reference to FIGS. 3 and 4. the host device 505 may be an example of the external memory controller 105 as described with reference to FIG. 1, which may be an example of the host device 305 as described with reference to FIG. 3; the driver 525 may be an example of the driver 325 as described with reference to FIG. 3, which may be an example of a page migration driver; the memory device 510 may be an example of memory device 310 as described with reference to FIG. 3, which may be an example of memory device 110 as described with reference to FIG. 1.

The system 500 may utilize a two-tier memory system, where each DIMM 575-a includes a memory 540 (e.g., memory with a relatively fast access) and a high-density memory 570 (e.g., memory having a relatively high capacity). The system 500 may further be configured to perform a data migration operation as a background operation while the host device 505 accesses the memory 540 concurrently (e.g., as a foreground operation).

The operating system (OS) 535 may indicate a fault to the driver 525 (e.g., a page fault). The driver may transmit a data migration request to the CPU cluster 555 at the host device chipset 550. This data migration request may then be transmitted to a direct memory access (DMA) controller on the host device chipset 550, which may facilitate channel interleaving. The DMA controller may break the data migration request into the sub-requests based on hardwired connections of the interconnect network (ICN) 560. The ICN 560 may transmit commands, requests, and/or sub-requests to a corresponding DIMM 575 of the memory device 510. Data indicated by each of the sub-requests may be transferred from the memory device 510 to the host device 505. The data is then transferred back to the memory device 510.

Some memory systems use channel interleaving as a way to increase the speed of access operations. For example, a memory device may increase the speed of access operations by spreading memory addresses across different memory banks. In these cases, access operations may be configured to use multiple memory banks in parallel, resulting in higher memory throughputs by reducing time spent waiting for other access operations to complete on a given memory bank. The ICN 560 may be configured to support memory interleaving by including a plurality of channels that route data to a plurality of different memory banks so they can work in parallel to execute a single access operation. For example, a host device may request data, but due to interleaving, that data may be spread across multiple memory banks. Storing or retrieving data in such a system is faster because multiple memory banks may be working parallel to execute a single access operation.

In systems that use interleaving, the host device may issue commands (e.g., data migration commands) that expect interleaving to occur. Further, the host device may issue data migration commands that expect the high-density memory to be positioned externally from the memory device. By integrating the high-density memory 570 into the memory device 510, existing data migration commands issued by a host device 505 may be routed incorrectly by the existing ICN 560. To address this issue and other issues, the host device 505 may include the driver 525 to break a data migration command into sub-commands, requests, or sub-requests and transmit those sub-commands, requests, or sub-requests to the correct locations using the existing ICN 560. The driver 525 may determine an interleaving pattern based on a mapping of the data to the memory 540 (e.g., a mapping of an address associated with the data to a location at the memory 540). In some cases, the driver 525 may indicate the mapping to the page controllers 515 prior to executing a data migration operation (e.g., during an initialization procedure, during a configuration).

The system 500 may support data migration as a background process, where the page controller 515 facilitates the transfer of data between the memory 540 and the high-density memory 570. In such cases, the data may be transferred within a DIMM 575 rather than transferred through the host device 505 (and potentially between DIMMs 575). Driver 525 facilitates channel interleaving by breaking a data migration request into one or more sub-requests and transmitting the sub-requests to the page controller 515-a.

For example, the driver 525 may break the data migration into eight distinct sub-requests (e.g., each sub-request corresponds to a distinct eighth of a page data). The driver 525 may transmit each of the eight sub-requests to the memory device 510 (e.g., according to the sub-request paths 580). The page controller 515 (e.g., page controller 515-a or 515-b) may then execute those received sub-requests internally within the memory device 510 between the memory 540 and the high-density memory 570, rather sending the data being migrated to the host device 505. In some examples, the driver 525 may transmit four sub-requests to the DIMM 575-a via the sub-request path 580-a and four sub-requests to the DIMM 575-b via the sub-request path 580-b. In some cases, the DIMMs 575 may correspond to distinct channels such that dividing the sub-requests between DIMMs corresponds to channel interleaving.

Each of the sub-requests may be transmitted from the driver 525 to the page controller 515. The sub-requests may correspond to the commands (e.g., a commit command, an evict command) as discussed with reference to FIG. 4. In some cases, the sub-requests may be communicated over the CPU cluster 555 at the host device chipset 550, and over the ICN 560 to the memory 540. The memory 540 may propagate the sub-requests to the page controller 515. After receiving the sub-request to perform a portion of a data migration between a memory 540 and a high-density memory 570, the page controller 515 may facilitate the transfer of data (e.g., data indicated as part of the data migration operation by the sub-request).

In some cases, the data indicated for transfer by the sub-request may be stored in more than one location (e.g., bank, bank group, rank, row) within a memory 540-a or 550-b. Here, the page controller 515 may transfer data to or from the memory 540 in one or more transactions. Each transaction may be defined based on a location or locations within the memory 540 indicated by the sub-request. For example, a transaction may correspond to data stored within a single bank of the memory 540. In another example, a transaction may correspond to data stored within a single bank cluster of the memory 540. The page controller 515 may break the sub-request into one or more transactions, where each transaction includes a distinct portion of the data indicated within the sub-request.

The page controller 515 may facilitate the execution of each of the one or more transactions indicated by the sub-request. During the execution of the sub-request, a data buffer at the page controller 515 (e.g., a commit data buffer, an evict data buffer) may store data (e.g., corresponding to one or more transactions) to be transferred between the page controller 515 and the media controller 520. The media controller 520 may in turn communicate the data transfer to the high-density memory 570.

Figure 6:
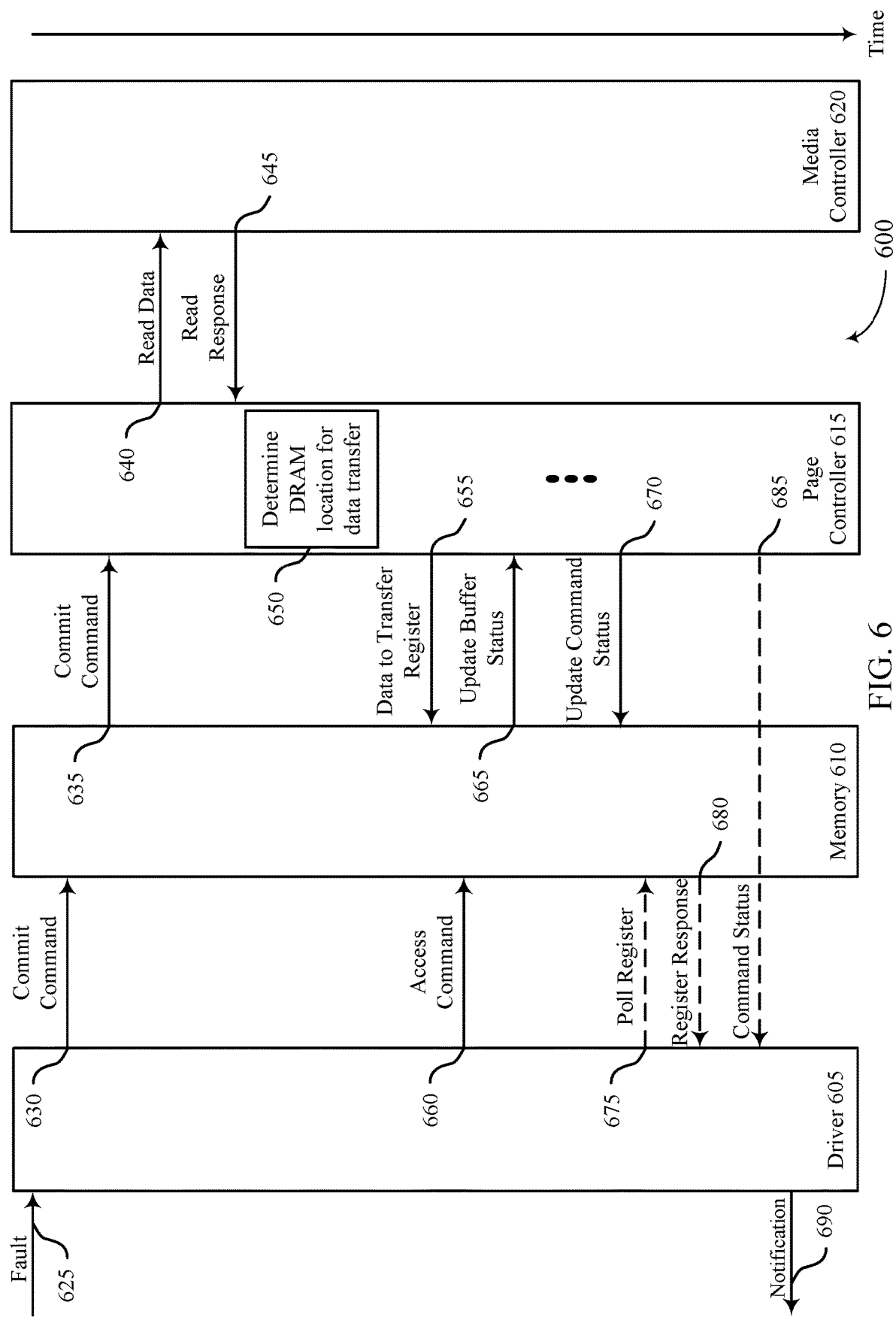
FIGS. 6 and 7 illustrate examples of timing diagrams that support data migration as disclosed herein.

FIG. 6 illustrates a timing diagram 600 corresponding to data migration as disclosed herein. The timing diagram 600 may correspond to a process resulting from a commit command for a data migration. A commit command may include one or more commands to move data from high-density storage to a memory 610. The timing diagram 600 may include one or more components described herein with reference to FIGS. 1, 2, 3, 4 and 5. For example, the page controller 615 may be an example of the device memory controller 155 as described with reference to FIG. 1 or may be an example of the page controllers 315, 415, and 515 as described with reference to FIGS. 3, 4, and 5; the driver 605 may be an example of the drivers 325 and 525 as described with reference to FIGS. 3 and 5, which may be examples of page migration drivers; the memory 610 may be an example of a memory die 160 as described with reference to FIG. 1, which may be an example of the memory 340 and 540 as described with reference to FIGS. 3 and 5; and the media controller 620 may be an example of a local memory controller 165 as described with reference to FIG. 1, which may be an example of media controllers 320 and 520 as described with reference to FIGS. 3 and 5.

At 625, the driver 605 may receive an indication of a fault from an operating system. In some cases, the fault may occur when the memory 610 does not include data that the operating system requests (e.g., during a read operation). In some cases, the fault may be an example of a page fault, where the fault indicates a page of data not included in the memory 610.

In response to receiving the fault indication, the driver 605 may transmit a commit command at 630 to the memory 610. The commit command may indicate data (e.g., based on the data indicated by the fault) to commit to the memory 610, where the commit command may correspond to a data migration request to transfer the data from high density media (e.g., a 3D NAND or 3D XPoint™ memory device) to a memory 610. The data migration request may include a data migration request (e.g., a request indicating a data transfer corresponding to all of the data indicated by the fault) or a data migration sub-request (e.g., a request indicating a portion of the data migration as a result of channel interleaving). In some cases, the indication may indicate a status command register, where the status command register indicates data (e.g., a page or a portion of a page of data) to be transferred in by the commit command.

The memory 610 may transmit a commit command at 635. The page controller 615 may receive the request (or sub-request) indicated by the commit command and determine data (e.g., the data indicated by the fault, a portion of the data indicated by the fault) indicated by the commit command.

At 640, the page controller 615 may then transmit an indication to the media controller 620 to read the data or portion of the data (e.g., as indicated by the commit commands transmitted at 630 or 635). The indication to read the data may include an address of the data. The page controller 615 may determine the address of the data based on the commit command (e.g., the address corresponding to an address for storing the data at the high density memory).

The media controller 620 may respond to the indication in read response at 645 by reading the data or portion of the data from a high density memory die to a data buffer (e.g., a commit data buffer as described with reference to FIG. 4) at the page controller 615.

At 650, the page controller 615 may determine that the data in the data buffer may be stored in more than one location (e.g., more than one bank, bank group, rank, row) within the memory 610. The page controller 615 may determine the more than one locations based on a mapping of the address of the data to the memory 610. The mapping may be received from the driver 605 at a time prior to 625 (e.g., as part of a configuration process). The page controller 615 may break down the data according to the more than one determined locations. For example, the page controller 615 may break down the data into one or more portions of data, where each portion of data corresponds to a distinct location at the memory 610.

The page controller 615 may divide the commit command into corresponding transactions. The page controller 615 may divide the data into a first quantity of portions of data to be stored at different locations within the memory 610. The page controller 615 may also divide the commit command into the first quantity of transactions, each indicating a transfer of a portion of data to the memory 610.

At 655, the page controller 615 may transfer some data (e.g., corresponding to a first portion of the one or more portions of data determined at 650) from its data buffer to a transfer data buffer at the memory 610. The page controller 615 may further indicate the commit transaction to the memory 610 in a data transfer register at the memory 610. In some cases, the transfer of some data by the page controller 615 to the transfer data buffer may correspond to a single transaction indicated by the data transfer register.

The memory 610 may hold the data in its transfer data buffer until an opportunity to transfer the data from the transfer data buffer to the memory 610 occurs.

In some cases, the opportunity to transfer data may correspond to the driver 605 accessing a certain portion of the memory 610. For example, the data being transferred may correspond to a specific location (e.g., a bank, bank group, rank, row). The opportunity to transfer the data from the transfer data buffer to the specific location may occur when the driver 605 accesses the memory 610 at a second location different than the specific location. In some cases, accessing the second location may indicate to the memory 610 that the specific location may not be accessed by the driver 605 (e.g., the specific location may not be accessed at a same time as the second location).

At 660, the driver 605 may transmit an access command to access the memory 610. The access command at 660 may create the opportunity to transfer the data from the transfer data buffer. The access command may access the second location of the memory 610, which may indicate to the memory 610 that data may be transferred from the transfer data buffer to the specific location without disrupting access operations of the memory 610 (e.g., a write operation, a read operation) requested by the host device. That is, while the memory 610 responds to the access command provided by the host device, the memory 610 may concurrently transfer the data from the transfer data buffer to the specific location of the memory 610. In some cases, the memory 610 may wait to transfer the data from the transfer data buffer to the specific location until receiving the access command at 660.

At 665, the memory 610 may update a transfer data buffer status. The status may indicate that the transfer data buffer may be available for new data (e.g., the page controller 615 may write new data to the transfer data buffer, the data within the transfer data buffer may not be valid). In some cases, the page controller 615 may transfer a second portion of data to the data transfer register (e.g., as at 655, corresponding to a second transaction). That is, a second portion of data may (e.g., as determined at 650) may be transferred from the data buffer at the page controller 615 to the transfer data buffer at memory 610. In this case, the second portion of data may be transferred to the memory 610 (e.g., as discussed with reference to 660 and 665). This may continue (e.g., the data transfer at 655, the access command at 660, and the update at 665) until each of the portions of data in the data buffer at page controller 615 have been transferred to the memory 610.

At 670, the page controller may transmit an update command status to memory 610. The command status may indicate that the data indicated by the commit commands at 630 and 635 has been transferred from the high density memory to the memory 610 (e.g., that the sub-request indicated by the commit command has been completed).

At 675, in some cases, the driver 605 may poll a register (e.g., a status ready register, a memory mapped region) associated with the memory 610. The register may indicate the update command status. At 680, the memory 610 may indicate the update command status (e.g., received at 670 from the page controller 615) at the register, thus communicating to the driver 605 that the sub-request has been completed. In some other cases, the driver 605 may communicate the updated command status directly with the page controller 615 using a sideband channel and the polling may not be performed (e.g., as indicated at 685).

At 690, the driver 605 may transmit a notification to the operating system indicating the completion of the sub-request.

The time between the fault at 625 and the notification at 690 may correspond to a time it takes for the commit command to execute. During this time, the memory 610 may migrate data (e.g., a page of data or a portion of a page of data) from high density memory to the memory 610 in the background while one or more access commands may be executed at the memory 610 in the foreground.

Figure 7:
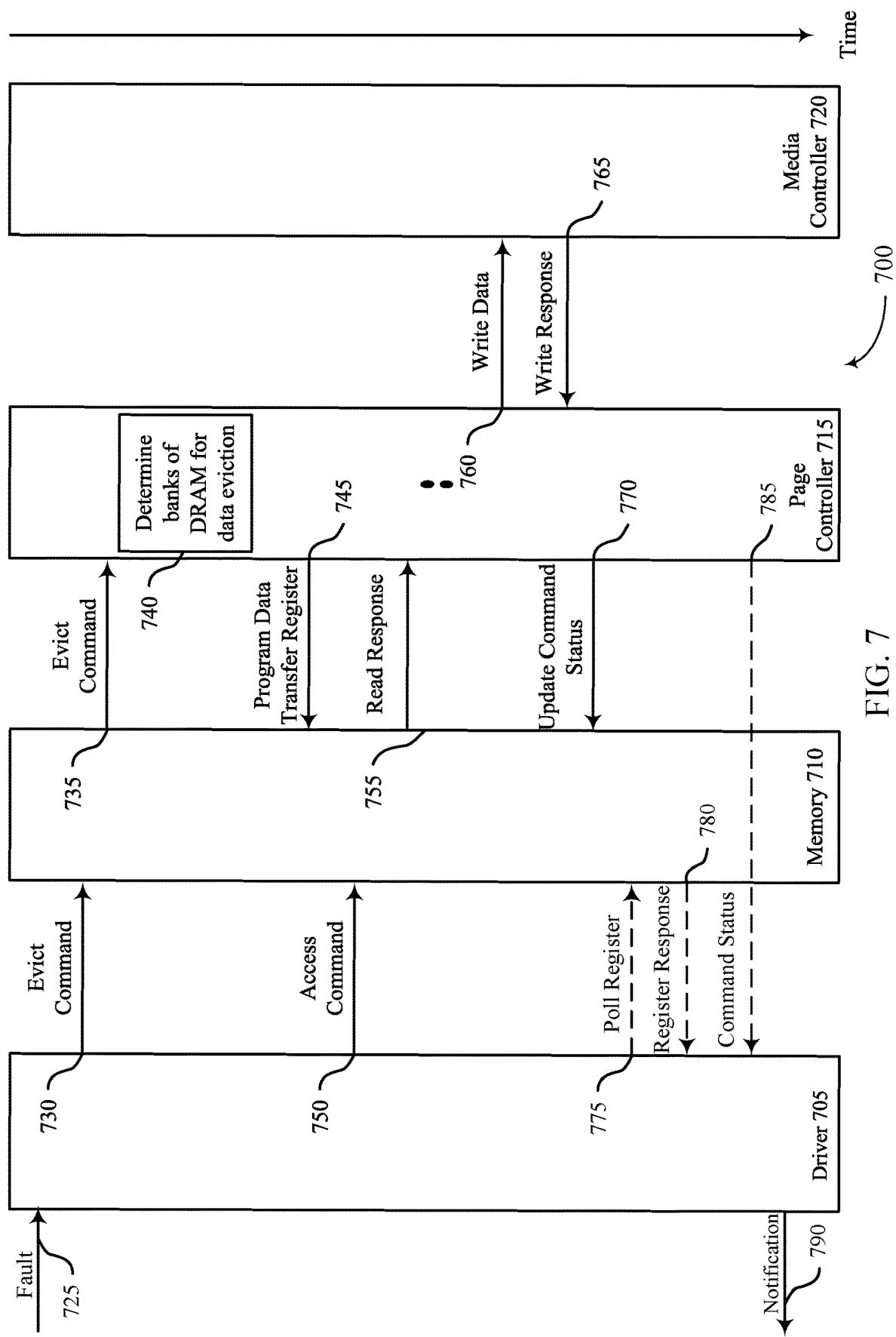

FIG. 7 illustrates a timing diagram 700 corresponding to data migration as disclosed herein. The timing diagram 700 may correspond to a process resulting from an evict command for a data migration. An evict command may include one or more commands to move data from a memory 710 to a high-density memory. The timing diagram 700 may include one or more components described herein with reference to FIGS. 1, 2, 3, 4, and 5. For example, the page controller 715 may be an example of the device memory controller 155 as described with reference to FIG. 1, which may be an example of the page controllers 315, 415, 515, and 615 as described with reference to FIGS. 3 through 6; the driver 705 may be an example of the drivers 325, 525, and 605 as described with reference to FIGS. 3, 5, and 6, which may be examples of a page migration driver; the memory 710 may be an example of a memory array 170 as described with reference to FIG. 1, which may be an example of memory 340, 540, and 610 as described with reference to FIGS. 3, 5, and 6; and the media controller 720 may be an example of a local memory controller 175 as described with reference to FIG. 1, which may be an example of media controllers 320, 520, and 620 as described with reference to FIGS. 3, 5, and 6.

At 725, the driver 705 may receive an indication of a fault from an operating system. In some cases, the fault may occur when the memory 710 does not include adequate space to store data that the operating system wants to save to the memory 710 (e.g., during a write operation) during an access operation. In some cases, the fault may be an example of a page fault, where the fault indicates a page of data not included in the memory 710.

In response to receiving the fault indication, the driver 705 may transmit an evict command at 730 to the memory 710. The evict command may indicate data (e.g., based on the data indicated by the fault) to evict from the memory 710, where the evict command may correspond to a data migration request to transfer the data from high density media (e.g., a 3D NAND or 3D XPoint™ memory device) to a memory 710. The data migration request may include a page migration request (e.g., a request indicating a data transfer corresponding to all of the data indicated by the fault) or a page migration sub-request (e.g., a request indicating a portion of the data migration as a result of channel interleaving). In some cases, the indication may indicate a status command register, where the status command register indicates data (e.g., a page or a portion of a page) to be transferred in by the commit command.

The memory 710 may transmit an evict command at 735. The page controller 515 may receive the request (or sub-request) indicated by the evict command and determine data (e.g., the data indicated by the fault, a portion of data indicated by the fault) indicated by the evict command. In some cases, the data may be indicated by an address associated with data (e.g., the address corresponding to an address for storing the data at the high density memory).

At 740, the page controller 715 may determine that the data indicated by the evict command may be stored in more than one location (e.g., more than one bank, bank group, rank, row) within the memory 710. The page controller 715 may determine the more than one locations based on a mapping of the address of the data to the memory 710. The mapping may be received from the driver 705 at a time prior to 725 (e.g., as part of a configuration process). The page controller 715 may break down the data according to the more than one determined locations. For example, the page controller 715 may break down the data into one or more portions of data, where each portion of data corresponds to a distinct location at the memory 710. Accordingly, the page controller 715 may break down the request (or sub-request) into one or more transactions, where each transaction corresponds to one of the portions of data.

At 745, the page controller 715 may program a data transfer register at the memory 710. That is, the page controller 715 may indicate, via the data transfer register, a portion of data to be read from the memory 710 and subsequently written to the data transfer register to be transferred to the high density memory. The memory 710 may wait to write the data to its transfer data buffer until an opportunity to transfer the data from the memory 710 to the transfer data occurs. In some cases, the opportunity to transfer data may correspond to the driver 705 accessing a certain portion of the memory 710.

For example, the data being transferred from the memory 710 may correspond to a specific location (e.g., a bank, bank group, rank, row). The opportunity to transfer the data from the specific location to the transfer data buffer may occur when the driver 705 accesses the memory 710 at a second location different than the specific location. In some cases, accessing the second location may indicate to the memory 710 that the specific location may not be accessed by the driver 705 (e.g., the specific location may not be accessed at a same time as the second location).

At 750, the driver 705 may transmit an access command to access the memory 710. The access command at 750 may create the opportunity to transfer the data from the data buffer. The access command may access the second location of the memory 710, which may indicate to the memory 710 that data may be transferred from specific location to the transfer data buffer without disrupting operations of the memory 710 requested by the host device. That is, while the memory 710 responds to the access command provided by the host device, the memory 710 may concurrently transfer the data from the specific location of the memory 710 to the transfer data buffer. In some cases, the memory 710 may wait to transfer the data from the specific location to the transfer data buffer until receiving the access command at 750.

At 755, the memory 710 may update the transfer buffer with the read response. The transfer data buffer may contain the indicated portion of data read from the memory 710. As such, the page controller 715 may transfer the data from the transfer data buffer to its own data buffer. As such, the transfer data buffer may be available for a new transaction (e.g., the page controller 715 may indicate a new portion of data to be read from the memory 710 to the transfer data buffer). In some cases, the page controller 715 may indicate a second portion of data to be read to the data transfer register (e.g., as at 745). In this case, the second portion of data may be transferred from the memory 710 (e.g., as discussed with reference to 750 and 755) to the data buffer at the page controller 715. This may continue (e.g., the data transfer register program at 745, the access command at 750, and the read response at 755) until each of the portions of data in the memory 710 indicated by the request (or sub-request) of the evict command have been transferred from the memory 710 to the data buffer at page controller 715.

At 760, the page controller 715 may write the data within its data buffer to the media controller 720. The media controller 720 may respond to the indication at 765 with a write response. The write response may indicate to the page controller that the data has been transferred to the high density memory (e.g., as indicated by the evict commands transmitted at 730 or 735).

At 770, the page controller may transmit an update command status to memory 710. The command status may indicate that the data indicated by the evict commands at 730 and 735 has been transferred to the high density memory from the memory 710 (e.g., that the sub-request indicated by the evict command has been completed).

At 775, in some cases, the driver 705 may poll a register (e.g., a status ready register, a memory mapped region) associated with the memory 710. The register may indicate the status of the evict command. At 780, the memory 710 may indicate the update command status (e.g., received at 770 from the page controller 715) at the register, thus communicating to the driver 705 that the sub-request has been completed. In some cases, the driver 705 may communicate the updated command status 785 directly with the page controller 715 using a sideband channel and the polling may not be performed.

At 790, the driver 705 may transmit a notification to the operating system indicating the completion of the sub-request.

The time between the fault 725 and the notification at 790 may correspond to a time it takes for the evict command to execute. During this time, the memory 710 may migrate data (e.g., a page of data, a portion of a page of data) to high density memory from the memory 710 in the background while one or more access commands may be executed at the memory 710 in the foreground.

Figure 8A:
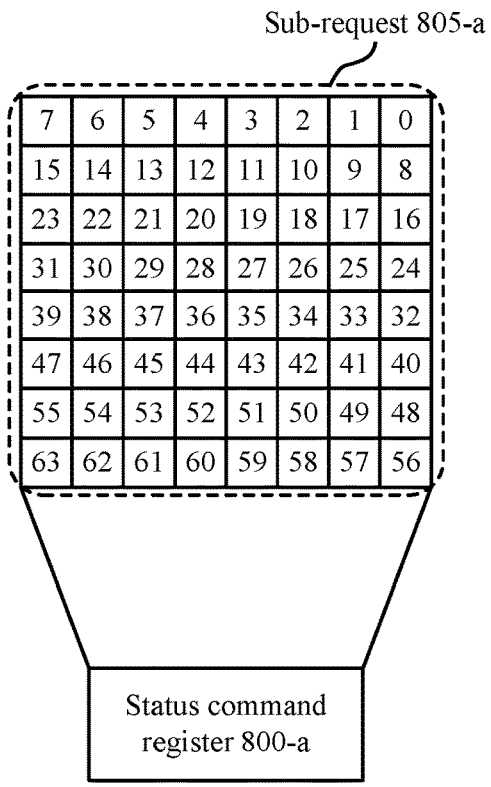
FIGS. 8A, 8B and 9 illustrate examples of status registers that support data migration as disclosed herein.

FIG. 8A illustrates a status command register 800-a for performing data migration as disclosed herein. The status command register 800-a may be used in conjunction with the systems described in FIGS. 1, 3, 4, and 5 as well as the timing diagrams described in FIGS. 6 and 7. For example, the status command register may be used (e.g., by a host device, by a driver such as a page migration driver) to indicate a data migration operation to a memory device (e.g., a page controller).

The status command register 800-a may correspond to a subset of data (e.g., a page of data or 4096 bits of data). The page of data may be broken up into a quantity of sectors. Each sector may be a single bit of data within the status command register 800-a that indicates whether the data migration operation for a subset of data is complete or not. Here, the status command register 800-a may represent 64 sectors of data (e.g., each bit may correspond to 64 bits of a 4096 bit page). Each bit may store a logical '0' or a logical '1' to indicate whether to perform a data migration of the corresponding sector of data. For example, a logical '0' in bit 8 of the status command register 800-a may indicate (e.g., to a page controller) to transfer the eighth sector of data of a page (e.g., the eighth sector of 64 bits of a 4096 bit page).

In some cases, the status command register may be organized into one or more sub-requests 805. A sub-request may correspond to an indication for a data migration (e.g., a commit command, an evict command) such that each sub-request may be associated with a distinct data migration indication (e.g., a bit within status command register 800-a). In some cases, each of the sub-requests 805 may be transmitted to a page controller via distinct channels. However, in some cases, there may be a limited quantity of channels available (e.g., 8 channels). In this case, the sub-requests 805 may be issued across the available channels (e.g., two of sixteen sub-requests sent to the page controller via each of the eight channels). In some cases, the page controller may receive a sub-request and may further decompose the sub-request into one or more transactions.

The quantity of sub-requests generated for a subset of data being transferred during a data migration operation may correspond to a type of channel interleaving. That is, a data migration command for a single memory device that includes a memory and a high-density memory may contain one or more sub-requests. In some cases, a single sub-request may correspond to a 4096 bit interleaving (e.g., a single sub-request corresponding to a 4096 bit data migration). Similarly, using two sub-requests may correspond to a 2048 bit interleaving (e.g., two sub-requests of 2048 bits each). Here, the entire status command register 800-a may be transmitted within a single sub-request 805-a.

In some cases, the indication may be transmitted with a sub-request granularity. For example, a single bit may be used to indicate a page migration operation for all of the data indicated by the bits of the status command register 800-a included in the sub-request 805-a. That is, a single bit indicating a '1' logic value may indicate to a page controller to transfer an entire page of data (and corresponding one or more sectors of data) indicated by status command register 800-a.

Figure 8B:
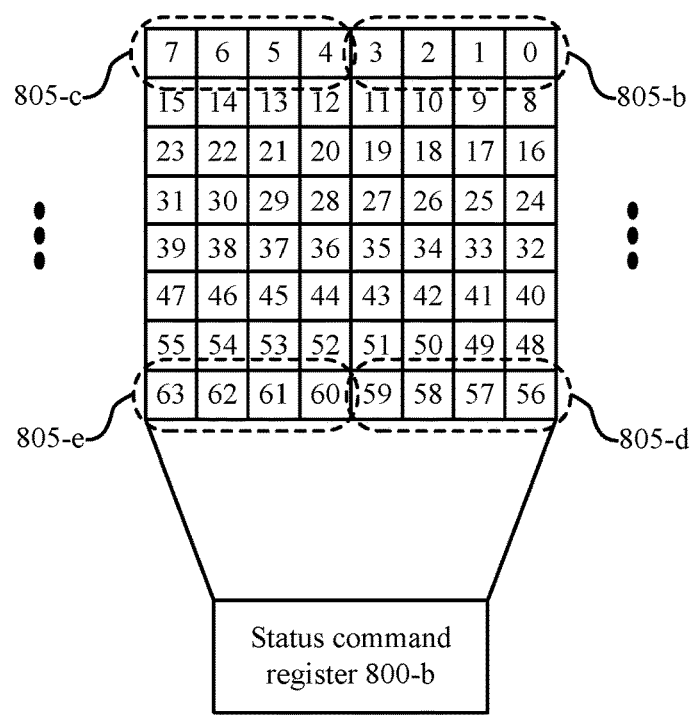

FIG. 8B illustrates a status command register 800-b for performing data migration as disclosed herein. The status command register 800-b may be used in conjunction with the systems described in FIGS. 1, 3, 4, and 5 as well as the timing diagrams described in FIGS. 6 and 7. For example, the status command register may be used (e.g., by a host device, by a driver such as a page migration driver) to indicate a page migration operation to a memory device (e.g., a page controller).

The status command register 800-b may correspond to a subset of data (e.g., a page of data or 4096 bits of data). The page of data may be broken up into a quantity of sectors. Each sector may be a single bit of data within the status command register 800-b that indicates whether the data migration operation for a subset of data is complete or not. Here, the status command register 800-a may represent 64 sectors of data (e.g., each bit may correspond to 64 bits of a 4096 bit page). Each bit may store a logical '0' or a logical '1' to indicate whether to perform a data migration of the corresponding sector of data. For example, a logical '0' in bit 8 of the status command register 800-b may indicate (e.g., to a page controller) to transfer the eighth sector of data of a page (e.g., the eighth sector of 64 bits of a 4096 bit page). Each sector of the of the status command register 800-a may represent a single data migration command to be performed by a single memory device. Meaning, sector 8 may represent that a first memory device is to perform a commit command to move data from a high-density memory of the first memory device to a memory of the first memory device.

In some cases, the status command register may be organized into one or more sub-requests 805. A sub-request may correspond to an indication for a data migration (e.g., a commit command, an evict command) such that each sub-request may be associated with a distinct data migration indication (e.g., a bit within status command register 800-b). In some cases, each of the sub-requests 805 may be transmitted to a page controller via distinct channels. However, in some cases, there may be a limited quantity of channels available (e.g., 8 channels). In this case, the sub-requests 805 may be issued across the available channels (e.g., two of sixteen sub-requests sent to the page controller via each of the eight channels). In some cases, the page controller may receive a sub-request and may further decompose the sub-request into one or more transactions.

The quantity of sub-requests generated for a subset of data being transferred during a data migration operation may correspond to a type of channel interleaving. That is, using a single sub-request may correspond to a 4096 bit interleaving (e.g., a single sub-request corresponding to a 4096 bit data migration). Similarly, using two sub-requests may correspond to a 2048 bit interleaving (e.g., two sub-requests corresponding to 2048 bits each). Here, the status command register 800-b may be divided into 16 sub-requests corresponding to 256 bit channel interleaving.

In some cases, an indication for a data migration may be transmitted with a sub-request granularity. For example, a single bit may be used to indicate a page migration operation for all of the data indicated by each of the bits included in each sub-request 805 (e.g., a single bit may indicate a data transfer migration for the data indicated by bits 0, 1, 2, and 3 of sub-request 805-b).

Figure 9:
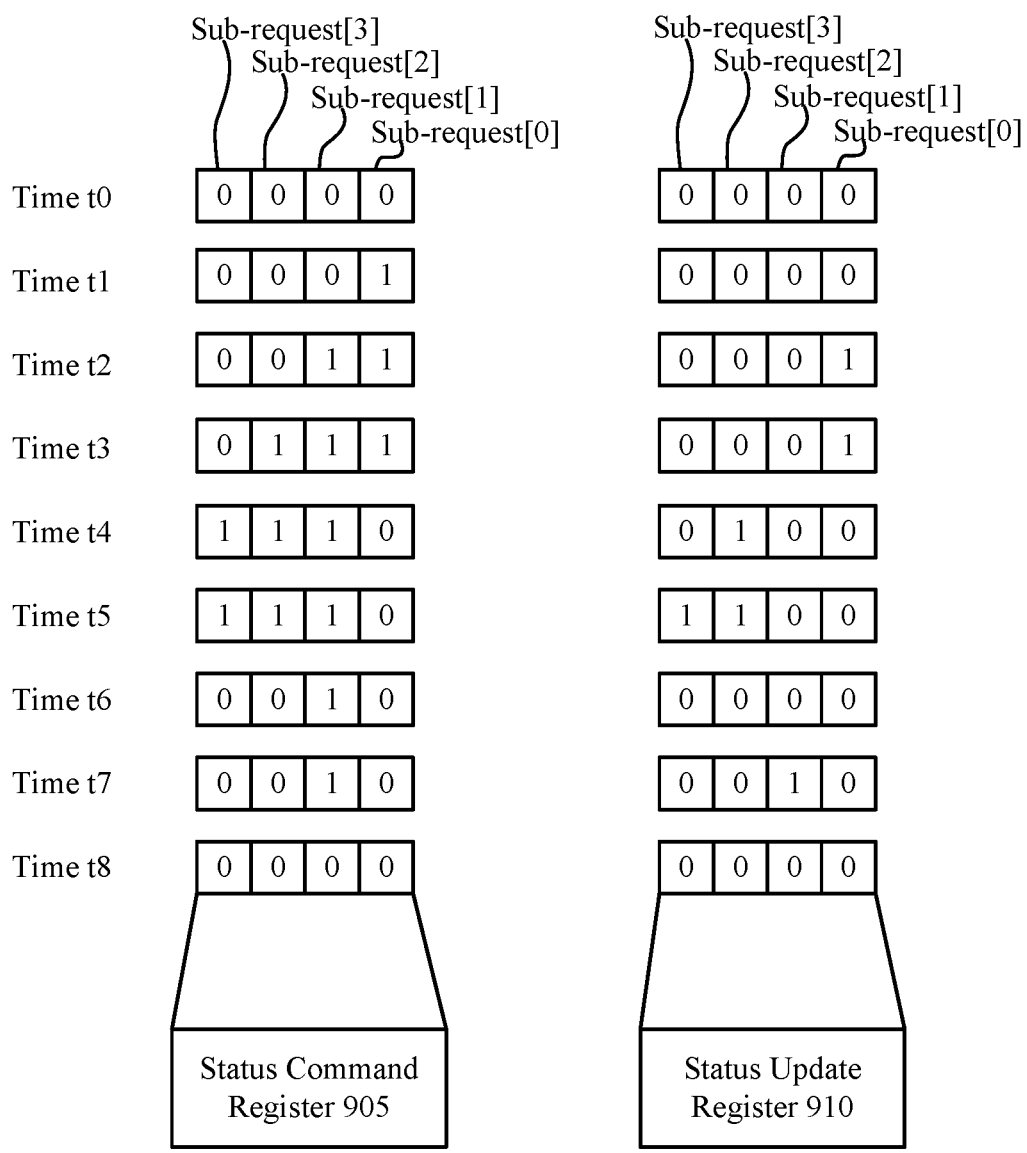

FIG. 9 illustrates a status command flow 900 associated with a data migration operation as disclosed herein. The status command flow 900 may include one or more aspects described herein with reference to FIGS. 1 through 8. For example, the status command register 905 may be an example of the status command registers 800 as discussed with reference to FIGS. 8A and 8B.

The status command register 905 may be used to store an indication about a data migration operation to be used by a host device (e.g., by a driver such as a page migration driver) and/or a memory device (e.g., a page controller). Here, the status command register 905 may include four bits corresponding to four sub-requests. In some cases, 1024 bit interleaving may be used to generate the four sub-requests from a 4096 bit page. A logical '1' may correspond to an indication of the sub-request to be processed. A logical '0' may indicate that the sub-request has been completed.

The status update register 910 may be used to indicate (e.g., by a memory device or by a page controller to a host device) a completion of a data migration operation. For example, the page controller may indicate the completion of a data migration operation upon completing one or more transactions corresponding to the data migration operation. The data migration operation may correspond to a commit command, an evict command, a sub-request, or a combination thereof. The status update register 910 may have a quantity of bits corresponding to the status command register 905. Each bit of the status update register may indicate a completion status corresponding to a sub-request indicated by each bit of the status command register 905. In some examples, a logic '0' may indicate no pending data migration operations (e.g., there may be no data in a data transfer buffer for a data migration indicated by the sub-request) while a logic '1' may indicate a current data migration operation (e.g., there may be data in a data transfer buffer for a data migration indicated by the sub-request).

At time t0 may correspond to a time prior to a beginning of a data migration operation. Here, the status command register 905 may not indicate any sub-requests for a data migration operation (e.g., each of the bits of the status command register 905 may contain a logic '0'). Further, the status update register 910 may not indicate any current data migration operations (e.g., each of the bits of the status update register 910 may contain a logic '0').

At time t1, the status command register 905 may indicate a first sub-request[0] by storing a logic '1, the first sub-request[0] corresponding to a first data migration. At time t2, the status command register may indicate a second sub-request (e.g., sub-request[1]) for a second data migration. Additionally, the status update register 910 may indicate, via the logic '1', that the data (e.g., a portion of data) indicated by the sub-request[0] may be in a transfer data buffer.

At time t3, the status command register 905 may further indicate a third sub-request (e.g., sub-request[2]) corresponding to a third data migration operation. At time t3, the status update register 910 may be executing the first data migration operation corresponding to the first sub-request [0].

At time t4, the status command register 905 may indicate a fourth sub-request, sub-request[3] and the status update register 910 may indicate valid data corresponding to sub-request[2] in a transfer data buffer. Further, the status update register 910 may indicate that there is no longer valid data corresponding to the sub-request[0] in a transfer data buffer and the status command register 905 may indicate that the sub-request[0] has been completed. In some cases, between time t3 and time t4, a host device may transmit an access command to a bank cluster corresponding to the data indicated by the sub-request[0]. This may allow the data to be transferred from the transfer data buffer (e.g., corresponding to a commit command and to a high density memory). In some cases, the access command may be a dummy access command transmitted by the host device in order to allow the data to be transferred from the transfer data buffer. That is, the host device may determine that the time between T=2 and T=3 has exceeded a certain threshold (e.g., as determined by an OS). Therefore, the host device may determine to transmit a dummy access command.

At time t5, the status command register 905 may be indicating three pending sub-requests (e.g., sub-request[1], sub-request[2] and sub-request[3]). The status update register 910 may indicate that valid data corresponding to the sub-request[3] and sub-request[2] are in transfer data buffers.

At time t6, the status update register 910 may indicate that no data is currently pending in a transfer data buffer while the status command register 905 may indicate that sub-request[1] may still be being processed.

At time t7, the status update register 910 may indicate valid data corresponding to sub-request[1] in a transfer data buffer. In some cases, between time t6 and time t7, a host device may transmit an access command to a bank cluster corresponding to the data indicated by the sub-request[1]. This may allow the data to be transferred to the transfer data buffer (e.g., corresponding to an evict command and from a page migration DRAM).

In some cases, a data migration command may not be executed in a timely manner (e.g., sub-request [1]). This may occur because the data migration commands are executed opportunistically in a bank cluster when the host device causes that same bank cluster to be accessed for other reasons. If the host device does not access a particular bank cluster associated with the sub-request, then the sub-request may not be performed. In some cases, the host device may not access the same bank cluster during a normal operation (e.g., the access commands associated with the normal operation may not be directed to the same bank cluster). In this case, a data migration command may be stalled. The stalled data migration command may correspond to, for example, data to be transferred from the transfer data buffer to the memory (e.g., a page migration DRAM) or data to be transferred from the memory to the transfer data buffer.

The host device or the page controller may issue a dummy access command to allow the data to be transferred with the transfer data buffer. The host device or the page controller may determine that a command for a data migration command has stalled by determining that a duration since the memory device has received the sub-request (e.g., sub-request[1] at t2) has satisfied a threshold (e.g., between time t2 and time t6) corresponding to a stalled transfer. Additionally or alternatively, a memory controller (e.g., a page controller) may determine that the duration since the memory device has received the sub-request has satisfied the threshold and may indicate to the host device a stalled data migration operation. Therefore, the host device may determine to transmit a dummy access command.

At time t8, the status command register 905 may indicate that there may be no pending sub-requests (e.g., each bit of the status command register 905 may be a logic '0.' Further, there may be no valid data indicated by status update register 910 in transfer data buffers.

Figure 10:
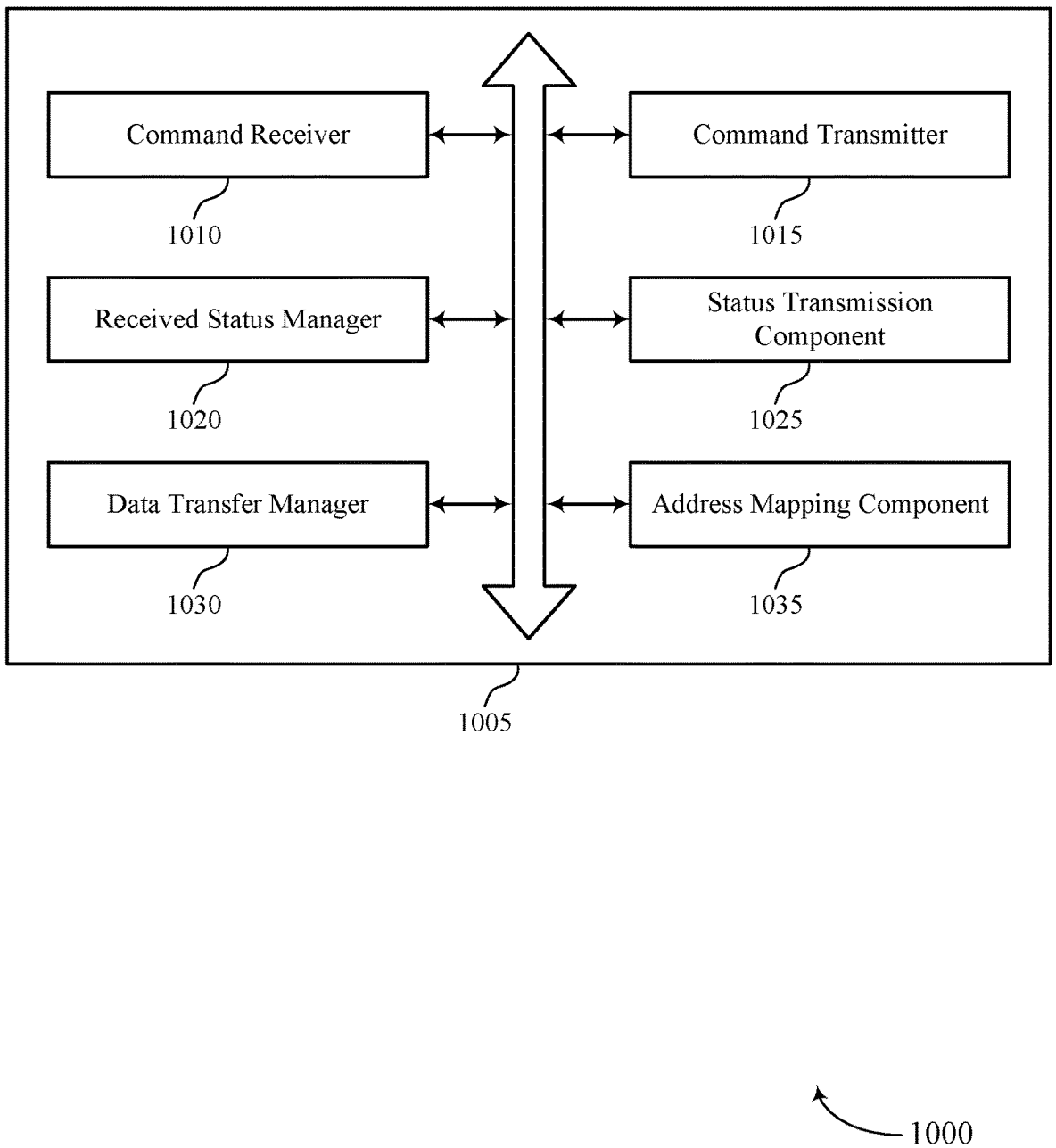
FIG. 10 illustrates a block diagram for an apparatus that supports data migration as disclosed herein.

FIG. 10 shows a block diagram 1000 of a device 1005 that supports data migration as disclosed herein. The device 1005 may be an example of a controller (e.g., a page controller as disclosed herein). The device 1005 may include a command receiver 1010, a command transmitter 1015, a received status manager 1020, a status transmission component 1025, a data transfer manager 1030, and an address mapping component 1035. Each of these modules may communicate, directly or indirectly, with one another (e.g., via one or more buses).

The command receiver 1010 may receive a first command to transfer a first data set between a first bank of a first memory device of a memory system and a second memory device of the memory system. In some cases, the first data set corresponds to a portion of a page of data. In some examples, the command receiver 1010 may receive the first command from the host device via a sideband channel that is different than a bus for data, a command, a status, or combinations thereof. In some other examples, the command receiver 1010 may receive the first command from the first memory device via an interface for communicating with the first memory device.

The command transmitter 1015 may transmit, to the first memory device based on the first command, a second command to be executed concurrent with an access command to transfer a second data set between a host device and a second bank of the first memory device different than the first bank. In some cases, the first command corresponds to a commit command. In this case, the command transmitter 1015 may transmit the commit command to the second memory device via an interface for communicating with the second memory device. In some cases, the first command may correspond to an evict command. In this example, the command transmitter 1015 may transmit, to the first memory device, a third command including a second sub-command, where transmitting the third command is based on receiving the indication of the execution of the access command.

The received status manager 1020 may receive, from the first memory device, an indication of an execution of the access command and an execution of the second command concurrent with the execution of the access command.

The status transmission component 1025 may transmit, via the sideband channel to the host device, a second indication of an execution of the first command.

The data transfer manager 1030 may determine that the first command corresponds to more than one transfer of data, where a single transfer corresponds to a data transfer between a single bank of the first memory device and the second memory device.

In some cases, the first command may correspond to a commit command. Here, the data transfer manager 1030 may receive the first data set from the second memory device. In some examples, the data transfer manager 1030 may divide the first data set into portions of data based on a determination that the access command corresponds to more than one transaction of data. In some examples, transferring each of the portions of data from a controller to a buffer associated with the first memory device, where transmitting the second command includes transferring at least one of the portions of data. In some cases, transferring each of the portions of data may include the data transfer manager 1030 transferring a first portion of data to the buffer. Transferring each of the portions of data may further include the data transfer manager 1030 transferring a second portion of data to the buffer based on receiving the indication of the execution of the access command, where the indication indicates that the buffer is available.

In some cases, the first command corresponds to an evict command. Here, the data transfer manager 1030 may receive the first data set from the first memory device based on transmitting the second command. In some examples, the data transfer manager 1030 may transfer the first data set from a controller to the second memory device based on receiving the indication of the execution of the access command, where the indication indicates that at least a portion of the first data set has been transferred from the first memory device to a buffer associated with the controller. In some examples, receiving the first data set from the first memory device may include the data transfer manager 1030 dividing the first command into sub-commands corresponding to portions of the first data set associated with a single bank, where the second command includes a sub-command for evicting a portion of data from the single bank. In some examples, the data transfer manager 1030 may receive, from the first memory device, a first portion of the first data set.

The address mapping component 1035 may map an address associated with the first command to the first bank of the first memory device, where the determining that the first command corresponds to more than one transfer of data is based on mapping the address to the first bank.

Figure 11:
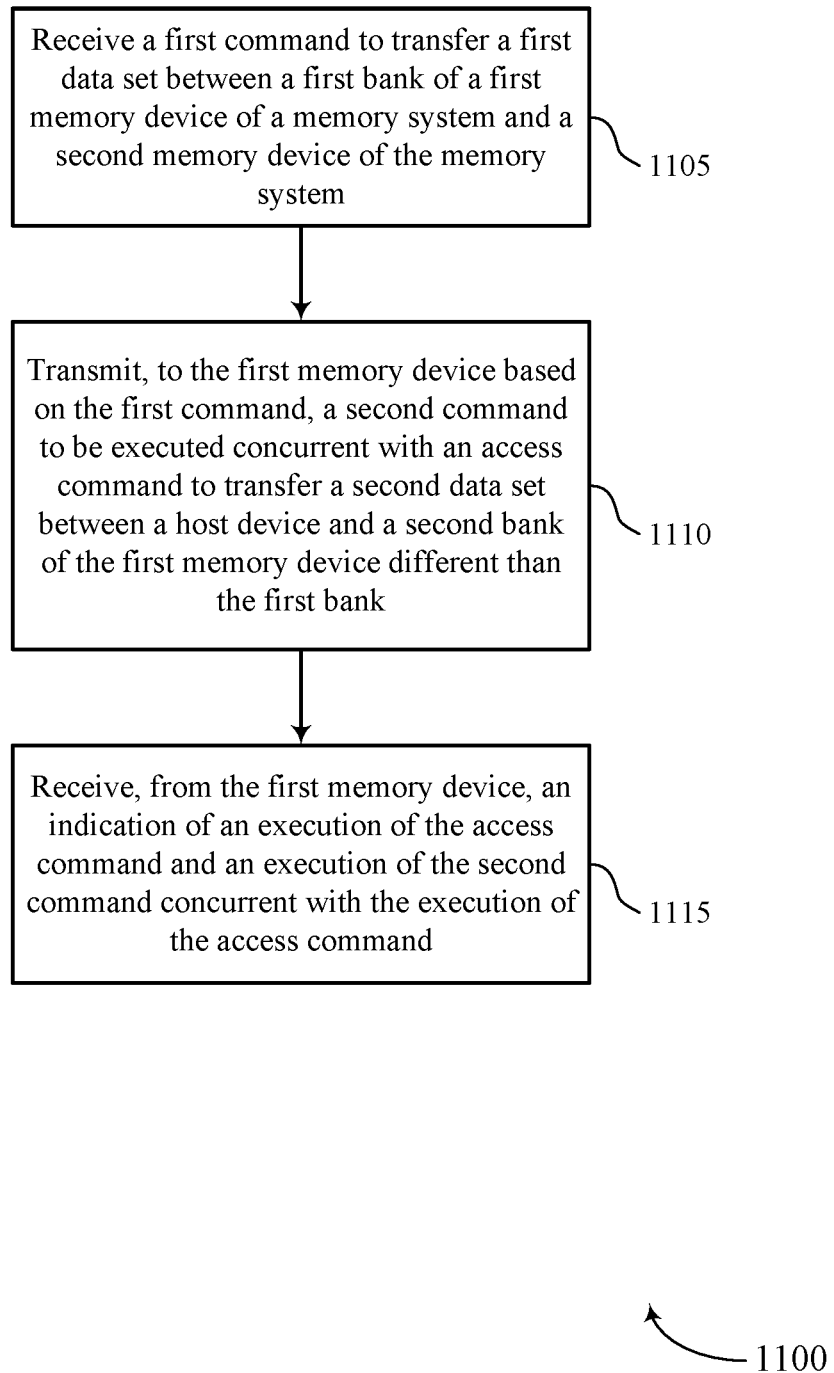
FIG. 11 illustrates a method or methods that support data migration as disclosed herein.

FIG. 11 shows a flowchart illustrating a method 1100 that supports systems, devices, and methods for data migration as disclosed herein. The operations of method 1100 may be implemented by a controller (e.g., a page controller as described herein) or its components as described herein. In some examples, a controller may execute a set of instructions to control the functional elements of the memory system to perform the functions described below. Additionally or alternatively, a controller may perform aspects of the functions described below using special-purpose hardware.

At 1105, the controller may receive a first command to transfer a first data set between a first bank of a first memory device of a memory system and a second memory device of the memory system. The operations of 1105 may be performed according to the methods described herein. In some examples, aspects of the operations of 1105 may be performed by a command receiver as described with reference to FIG. 10.

At 1110, the controller may transmit, to the first memory device based on the first command, a second command to be executed concurrent with an access command to transfer a second data set between a host device and a second bank of the first memory device different than the first bank. The operations of 1110 may be performed according to the methods described herein. In some examples, aspects of the operations of 1110 may be performed by a command transmitter as described with reference to FIG. 10.

At 1115, the controller may receive, from the first memory device, an indication of an execution of the access command and an execution of the second command concurrent with the execution of the access command. The operations of 1115 may be performed according to the methods described herein. In some examples, aspects of the operations of 1115 may be performed by a received status manager as described with reference to FIG. 10.

An apparatus for performing a method or methods, such as the method 1100, is described. The apparatus may include means for receiving a first command to transfer a first data set between a first bank of a first memory device of a memory system and a second memory device of the memory system, transmitting, to the first memory device based on the first command, a second command to be executed concurrent with an access command to transfer a second data set between a host device and a second bank of the first memory device different than the first bank, and receiving, from the first memory device, an indication of an execution of the access command and an execution of the second command concurrent with the execution of the access command.

In some examples, the apparatus may include features for receiving the first command may include operations, features, means, or instructions for receiving the first command from the host device via a sideband channel that may be different than a bus for data, a command, a status, or combinations thereof. In some examples, the apparatus may include features for receiving the first command may include operations, features, means, or instructions for receiving the first command from the host device via a sideband channel that is different than a command/address bus or data bus of the memory system. In some cases, the apparatus may include features for transmitting, via the sideband channel to the host device, a second indication of an execution of the first command. In some examples, the apparatus may include features for receiving the first command from the first memory device via an interface for communicating with the first memory device.

In some examples, the apparatus may include features for determining that the first command corresponds to more than one transfer of data, where a single transfer corresponds to a data transfer between a single bank of the first memory device and the second memory device.

In some examples, the apparatus may include features for mapping an address associated with the first command to the first bank of the first memory device, where the determining that the first command corresponds to more than one transfer of data may be based on mapping the address to the first bank.

In some examples, the first command may correspond to a commit command. In some instances, the apparatus may include features for transmitting the commit command to the second memory device via an interface for communicating with the second memory device, receiving the first data set from the second memory device, dividing the first data set into portions of data based on a determination that the access command corresponds to more than one transaction of data and transferring each of the portions of data from a controller to a buffer associated with the first memory device, where transmitting the second command includes transferring at least one of the portions of data.

In some examples, the apparatus may include features for transferring a first portion of data to the buffer and transferring a second portion of data to the buffer based on receiving the indication of the execution of the access command, where the indication indicates that the buffer may be available.

In some examples, the first command corresponds to an evict command. In some instances, the apparatus may include features for receiving the first data set from the first memory device based on transmitting the second command and transferring the first data set from a controller to the second memory device based on receiving the indication of the execution of the access command, where the indication indicates that at least a portion of the first data set may have been transferred from the first memory device to a buffer associated with the controller.

In some examples, the apparatus may include features for dividing the first command into sub-commands corresponding to portions of the first data set associated with a single bank, where the second command includes a sub-command for evicting a portion of data from the single bank, receiving, from the first memory device, a first portion of the first data set and transmitting, to the first memory device, a third command including a second sub-command, where transmitting the third command may be based on receiving the indication of the execution of the access command. In some examples, the first data set corresponds to a portion of a page of data.

An apparatus for data migration is described. The apparatus may include a first interface configured to communicate with a first memory device of a memory system, the first memory device including memory cells of a first type, a second interface configured to communicate with a second memory device of the memory system, the second memory device including memory cells of a second type different than the first type, a first buffer coupled with the first interface and the second interface and configured to store data to be transferred from the second memory device to the first memory device as part of a data migration operation, and a second buffer coupled with the first interface and the second interface and configured to store data to be transferred from the first memory device to the second memory device as part of the data migration operation.

In some examples, the apparatus may include a queue coupled with the first interface and configured to receive a command for transferring data between the first memory device and the second memory device. In some cases, the queue may be configured to receive the command via the first interface.

In some examples, the controller may be configured to receive, from the first memory device via the first interface, an indication of an execution of an access command for transferring data between the first memory device and a host device.

In some examples, the apparatus may include a third interface configured to communicate with a host device via a sideband channel that may be different than a bus for data, a command, a status, or combinations thereof, where the queue may be configured to receive the command from the host device via the sideband channel. In some examples, the apparatus may include a third interface configured to communicate with a host device via a sideband channel that may be different than a command/address bus or data bus of the memory system. In some cases, the controller may be configured to transfer an update command status indicating an execution of the command, via the sideband channel, to the host device. In some examples, the controller may be configured to map an address indicated by a command to one or more banks within the first memory device.

An apparatus for data migration is described. The apparatus may include a first interface to communicate with a first memory device of a memory system, the first memory device including memory cells of a first type, a second interface to communicate with a second memory device of the memory system, the second memory device including memory cells of a second type different than the first type, a controller operable to, transmitting, to the first memory device based on receiving the first command, a second command to be executed concurrently with an access command to transfer a second data set between a host device and a second bank different than the first bank, and receiving, from the first memory device, an indication of an execution of the access command and an execution of the second command concurrent with the execution of the access command.

In some examples, the controller may be operable to receive the first command from the host device via a sideband channel. In some cases, the controller may be operable to transmit, via the sideband channel to the host device, a second indication of an execution of the first command. In some instances, the controller may be operable to receive the first command from the first memory device via the first interface. In some examples, the controller may be operable to determine that the first command corresponds to multiple transfers of data between a single bank of the first memory device and the second memory device.

It should be noted that the methods described herein describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" used herein refers to a stratum or sheet of a geometrical structure. each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    generating a command to transfer a data set from one or more first memory locations within a memory system to one or more second memory locations within the memory system;
    dividing the command into a set of sub-commands, wherein each sub-command of the set of sub-commands corresponds to a respective portion of the data set; and
    transmitting a first subset of the set of sub-commands to the memory system via one or more first channels and a second subset of the set of sub-commands to the memory system via one or more second channels different than the one or more first channels, the first subset of the set of sub-commands associated with data transfer between a first memory device and a second memory device of the memory system and the second subset of the set of sub-commands associated with data transfer between a third memory device and a fourth memory device of the memory system, and wherein the first memory device, the second memory device, the third memory device, and the fourth memory device are different from one another, and wherein the one or more first channels and the one or more second channels are different than a command/address bus or data bus.

2. The method of claim 1, further comprising:
    determining a mapping between an address associated with a respective portion of the data set and a location within the memory system, wherein the location within the memory system corresponds to one of the first memory device, the second memory device, the third memory device, or the fourth memory device, and wherein transmitting the first subset of the set of sub-commands and the second subset of the set of sub-commands is based at least in part on the mapping.

3. The method of claim 2, further comprising:
    transmitting, to the memory system and prior to transmitting the first subset of the set of sub-commands and the second subset of the set of sub-commands, an indication of the mapping, wherein transmitting the first subset of the set of sub-commands and the second subset of the set of sub-commands is based at least in part on the indication of the mapping.

4. The method of claim 1, further comprising:
transmitting, to the memory system, an access command to be executed concurrent with executing a sub-command of the first subset of the set of sub-commands, the access command indicating for the memory system to transfer a second data set between the first memory device and a host device.

5. The method of claim 4, wherein the sub-command of the first subset of the set of sub-commands comprises a commit command associated with data transfer from the second memory device to the first memory device, and the access command comprises a read command.

6. The method of claim 4, wherein the sub-command of the first subset of the set of sub-commands comprises an evict command associated with data transfer from the first memory device to the second memory device, and the access command comprises a write command.

7. The method of claim 1, wherein the first memory device and the third memory device comprise a first type of memory and the second memory device and the fourth memory device comprise a second type of memory.

8. The method of claim 1, wherein the memory system comprises a multi-tier memory system, wherein a first Dual In-line Memory Module (DIMM) of the multi-tier memory system comprises the first memory device and the second memory device and a second DIMM of the multi-tier memory system comprises the third memory device and the fourth memory device.

9. The method of claim 1, wherein the one or more first memory locations corresponds to one or more locations within one or more of the first memory device, the second memory device, the third memory device, or the fourth memory device, and wherein the one or more second memory locations corresponds to one or more second locations within one or more of the first memory device, the second memory device, the third memory device, or the fourth memory device different from the one or more locations.

10. A method, comprising:
receiving, from a host device, a first subset of a set of sub-commands via one or more first channels and a second subset of the set of sub-commands via one or more second channels different than the one or more first channels, the first subset of the set of sub-commands associated with data transfer between a first memory device and a second memory device of a memory system and the second subset of the set of sub-commands associated with data transfer between a third memory device and a fourth memory device of the memory system, wherein the set of sub-commands comprises a command to transfer a data set from one or more first memory locations of the memory system to one or more second memory locations of the memory system and each sub-command of the set corresponds to a respective portion of the data set, and wherein the first memory device, the second memory device, the third memory device, and the fourth memory device are different from one another, and wherein the one or more first channels and the one or more second channels are different than a command/address bus or data bus; and
transferring the data set from the one or more first memory locations to the one or more second memory locations based at least in part on the first subset of the set of sub-commands and the second subset of the set of sub-commands.

11. The method of claim 10, further comprising:
receiving, from the host device and prior to receiving the first subset of the set of sub-commands and the second subset of the set of sub-commands, an indication of a mapping between an address associated with a respective portion of the data set and a location within the memory system, wherein receiving the first subset of the set of sub-commands and the second subset of the set of sub-commands is based at least in part on the mapping.

12. The method of claim 10, further comprising:
receiving, from the host device, an access command to be executed concurrent with executing a sub-command of the first subset of the set of sub-commands, the access command indicating for the memory system to transfer a second data set between the first memory device and the host device.

13. The method of claim 12, wherein the sub-command of the first subset of the set of sub-commands comprises a commit command and the access command comprises a read command.

14. The method of claim 13, further comprising:
transmitting, by a first interface configured to communicate with the first memory device and the second memory device, the commit command to the second memory device;
receiving, by the first interface, the respective portion of the data set corresponding to the commit command from the second memory device; and
transferring, by the first interface, the respective portion of the data set corresponding to the commit command to a buffer associated with the first memory device.

15. The method of claim 12, wherein the sub-command of the first subset of the set of sub-commands comprises an evict command and the access command comprises a write command.

16. The method of claim 15, further comprising:
transmitting, by a first interface configured to communicate with the first memory device and the second memory device, the evict command to the first memory device;
receiving, by the first interface, the respective portion of the data set corresponding to the evict command from the first memory device; and
transferring, by the first interface, the respective portion of the data set corresponding to the evict command to a buffer associated with the second memory device.

17. The method of claim 10, further comprising:
determining that a respective portion of the data set corresponding to a sub-command of the first subset of the set of sub-commands is stored at more than one bank of the first memory device or the second memory device; and
transferring the respective portion of the data set between the first memory device and the second memory device in multiple transfers, each transfer of the multiple transfers corresponding to data transfer between a single bank of the first memory device and a single bank of the second memory device.

18. The method of claim 10, wherein one of the first memory device or the second memory device comprises high density memory and one of the third memory device or the fourth memory device comprises high density memory.

19. The method of claim 10, wherein the memory system comprises a two-tier memory system, wherein a first dual in-line memory module (DIMM) of the two-tier memory system comprises the first memory device and the second memory device and a second DIMM of the two-tier memory system comprises the third memory device and the fourth memory device.

20. An apparatus, comprising:
a first interface to communicate with a first memory device of a memory system, the first memory device comprising memory cells of a first type;
a second interface to communicate with a second memory device of the memory system, the second memory device comprising memory cells of a second type;
a third interface to communicate with a third memory device of the memory system, the third memory device comprising memory cells of the first type;
a fourth interface to communicate with a fourth memory device of the memory system, the fourth memory device comprising memory cells of the second type, wherein the first memory device, the second memory device, the third memory device, and the fourth memory device are different from one another;
first logic configured to:
 receive a first subset of a set of sub-commands from a host device via one or more first channels, the first subset of the set of sub-commands associated with data transfer between the first memory device and the second memory device; and
 transfer respective portions of a data set corresponding with the first subset of the set of sub-commands between the first memory device and the second memory device based at least in part on the first subset of the set of sub-commands; and
second logic configured to:
 receive a second subset of the set of sub-commands from the host device via one or more second channels different than the one or more first channels, the second subset of the set of sub-commands associated with data transfer between the third memory device and the fourth memory device of the memory system, wherein the set of sub-commands comprises a command to transfer the data set from one or more first memory locations of the memory system to one or more second memory locations of the memory system and each sub-commands of the set corresponds to a respective portion of the data set, and wherein the one or more first channels and the one or more second channels are different than a command/address bus or data bus; and
 transfer respective portions corresponding to the second subset of the set of sub-commands between the third memory device and the fourth memory device based at least in part on the second subset of the set of sub-commands.

* * * * *